United States Patent
Seethaler

(10) Patent No.: US 11,780,281 B2
(45) Date of Patent: Oct. 10, 2023

(54) INDEPENDENT WHEEL SUSPENSION FOR A TWO-TRACK VEHICLE, AXLE AND VEHICLE

(71) Applicant: Bayerische Motoren Werke Aktiengesellschaft, Munich (DE)

(72) Inventor: Ludwig Seethaler, Erdweg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 31 days.

(21) Appl. No.: 17/594,724

(22) PCT Filed: Apr. 8, 2020

(86) PCT No.: PCT/EP2020/060003
§ 371 (c)(1),
(2) Date: Oct. 27, 2021

(87) PCT Pub. No.: WO2020/221569
PCT Pub. Date: Nov. 5, 2020

(65) Prior Publication Data
US 2022/0227192 A1 Jul. 21, 2022

(30) Foreign Application Priority Data
May 2, 2019 (DE) .................. 10 2019 111 271.0

(51) Int. Cl.
*B60G 11/08* (2006.01)
*B60G 3/10* (2006.01)
(Continued)

(52) U.S. Cl.
CPC ............... *B60G 11/08* (2013.01); *B60G 3/10* (2013.01); *B60G 7/008* (2013.01); *B60G 11/12* (2013.01);
(Continued)

(58) Field of Classification Search
CPC .......... B60G 11/08; B60G 3/10; B60G 7/008; B60G 11/12; B60G 2200/1422;
(Continued)

(56) References Cited

U.S. PATENT DOCUMENTS

| 3,917,306 A * | 11/1975 | Madler | B60G 21/04 280/124.109 |
| 4,749,206 A * | 6/1988 | Delery | B60G 21/04 280/124.134 |

(Continued)

FOREIGN PATENT DOCUMENTS

| DE | 37 18 137 A1 | 12/1988 |
| DE | 102 39 388 A1 | 3/2004 |

(Continued)

OTHER PUBLICATIONS

International Search Report (PCT/ISA/210) issued in PCT Application No. PCT/EP2020/060003 dated Jul. 14, 2020 with English translation (seven (7) pages).

(Continued)

*Primary Examiner* — Toan C To
(74) *Attorney, Agent, or Firm* — Crowell & Moring LLP

(57) ABSTRACT

An independent wheel suspension for a two-track vehicle has a wheel carrier, a vibration damper designed and arranged in the manner of a damper strut, and a leaf spring element, which has, in particular, a fiber composite material or is made from a fiber composite material. The leaf spring element is oriented at least approximately in the transverse direction of the vehicle and is designed to provide a suspension function and, together with the vibration damper, to guide a vehicle wheel fastened to the wheel carrier when the independent wheel suspension is installed in a vehicle for functional usage. The leaf spring element is connected, on the wheel carrier end, to the wheel carrier via two rubber bearings, each having a bearing axis and a central bearing (Continued)

point, so as to be rotatable about the respective bearing axis of each rubber bearing and is designed to be connected, on the vehicle body end, to an axle support in a torsion-resistant manner and/or directly to a vehicle body.

22 Claims, 7 Drawing Sheets

(51) Int. Cl.
  *B60G 7/00* (2006.01)
  *B60G 11/12* (2006.01)
(52) U.S. Cl.
  CPC ............. *B60G 2200/1422* (2013.01); *B60G 2200/422* (2013.01); *B60G 2200/446* (2013.01); *B60G 2200/462* (2013.01); *B60G 2202/114* (2013.01); *B60G 2204/121* (2013.01); *B60G 2204/15* (2013.01); *B60G 2204/4106* (2013.01); *B60G 2204/4302* (2013.01); *B60G 2206/15* (2013.01); *B60G 2206/428* (2013.01); *B60G 2206/602* (2013.01); *B60G 2206/7101* (2013.01)
(58) Field of Classification Search
  CPC ........ B60G 2200/422; B60G 2200/446; B60G 2200/462; B60G 2202/114; B60G 2204/121; B60G 2204/15; B60G 2204/4106; B60G 2204/4302; B60G 2206/15; B60G 2206/428; B60G 2206/602; B60G 2206/7101
  See application file for complete search history.

(56) References Cited

U.S. PATENT DOCUMENTS

| | | | | |
|---|---|---|---|---|
| 4,887,841 A * | 12/1989 | Cowburn | ............... | B60G 11/08 280/124.171 |
| 6,029,987 A * | 2/2000 | Hoffman | ............... | B60G 11/10 267/260 |
| 6,688,586 B1 * | 2/2004 | Moore | ............... | F16F 1/185 267/230 |
| 9,073,400 B2 * | 7/2015 | Perri | ............... | B60G 7/008 |
| 9,656,528 B2 * | 5/2017 | Perri | ............... | B60G 15/068 |
| 11,298,999 B2 * | 4/2022 | Oh | ............... | B60G 9/02 |
| 2001/0042967 A1 * | 11/2001 | Stenvall | ............... | B60G 11/12 280/124.163 |
| 2002/0000703 A1 * | 1/2002 | Lawson | ............... | F16F 1/3686 280/124.135 |
| 2002/0043780 A1 * | 4/2002 | Sandahl | ............... | B60G 11/08 280/124.135 |
| 2017/0305222 A1 * | 10/2017 | Preijert | ............... | B60G 13/005 |
| 2018/0312026 A1 | 11/2018 | Rochell et al. | | |
| 2021/0379948 A1 * | 12/2021 | Rosenmeyer | ............ | B60G 11/08 |

FOREIGN PATENT DOCUMENTS

| | | |
|---|---|---|
| DE | 10 2017 201 747 B3 | 5/2018 |
| DE | 10 2017 109 063 A1 | 10/2018 |
| DE | 10 2017 215 630 A1 | 3/2019 |
| DE | 102021107800 A1 * | 9/2022 |
| EP | 3 121 037 A1 | 1/2017 |
| FR | 2 717 124 A1 | 9/1995 |
| JP | 2000-255233 A | 9/2000 |
| WO | WO 2017/191023 A1 | 11/2017 |

OTHER PUBLICATIONS

German-language Written Opinion (PCT/ISA/237) issued in PCT Application No. PCT/EP2020/060003 dated Jul. 14, 2020 (10 pages).
German-language Search Report issued in German Application No. 10 2019 111 271.0 dated Jan. 9, 2020 with partial English translation (12 pages).
Chinese-language Office Action issued in Chinese Application No. 202080032215.5 dated Jun. 2, 2023 with English translation (18 pages).

* cited by examiner

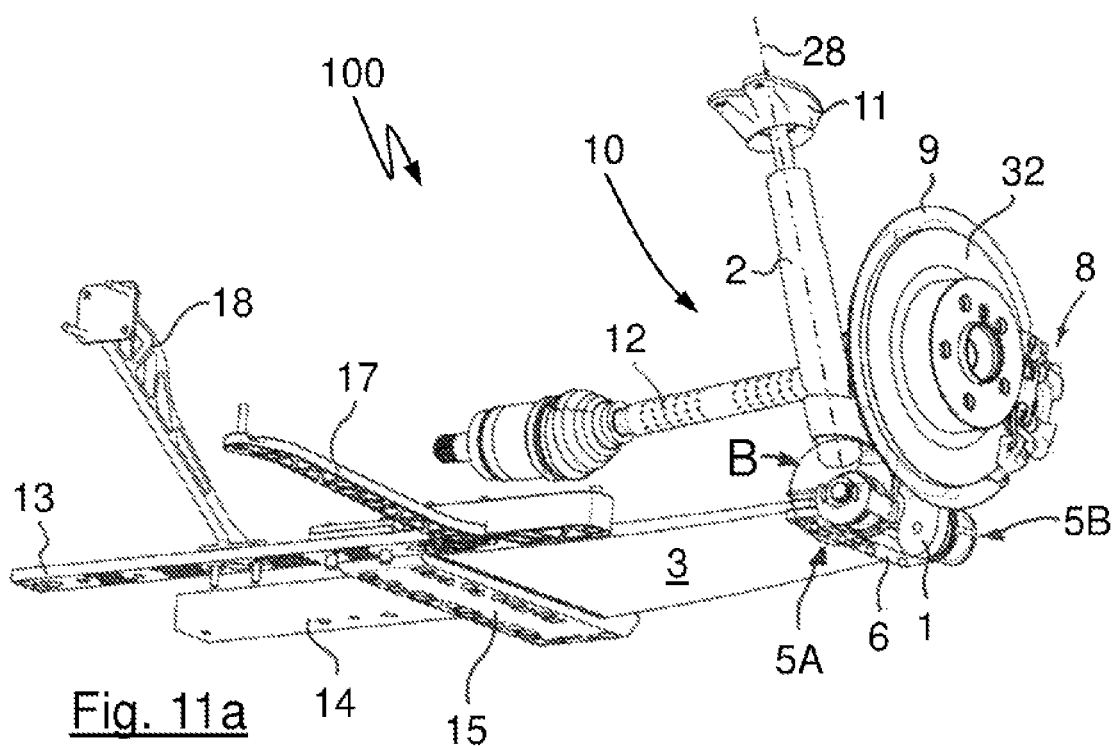
Fig. 11a
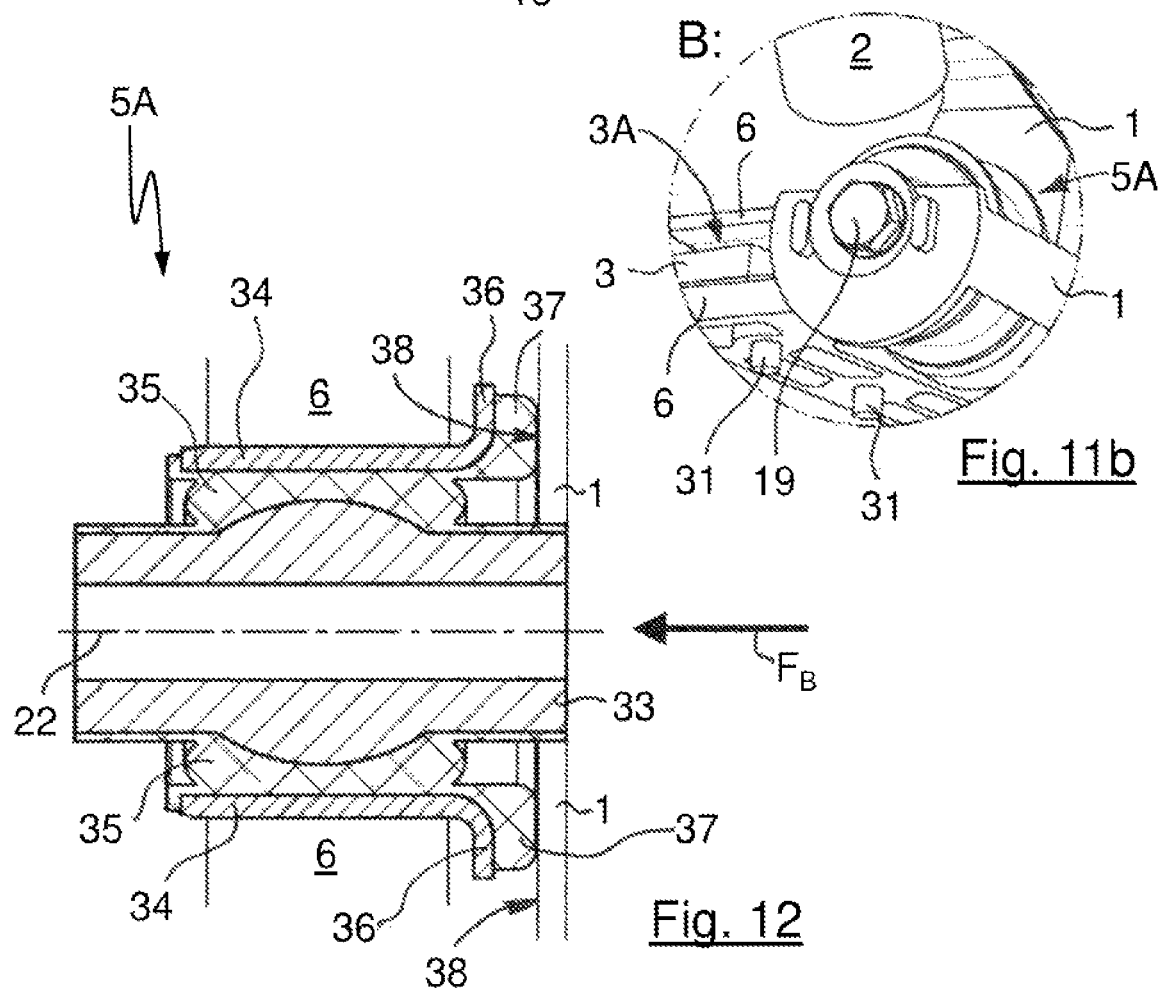
Fig. 11b
Fig. 12

INDEPENDENT WHEEL SUSPENSION FOR A TWO-TRACK VEHICLE, AXLE AND VEHICLE

BACKGROUND AND SUMMARY OF THE INVENTION

The invention relates to an independent wheel suspension for a two-track vehicle, in particular for a rear axle of a two-track vehicle, wherein the independent wheel suspension has a wheel carrier, a vibration damper configured and arranged in the manner of a damper strut, and a leaf spring element which, in particular, has a fiber composite material or is produced from a fiber composite material, wherein the leaf spring element is oriented at least approximately in a vehicle transverse direction and is configured to perform a suspension function and, together with the vibration damper, wheel guidance of a vehicle wheel which is fastened to the wheel carrier in a functional installed state of the independent wheel suspension in a vehicle, and wherein the leaf spring element is attached at a wheel carrier side to the wheel carrier by means of two rubber bearings with in each case one bearing axis and one bearing centerpoint, and in each case so as to be rotatable about the associated bearing axes of the rubber bearings, and is configured to be attached, at a vehicle body side, fixedly in terms of moments to an axle support and/or directly to a vehicle body.

With regard to the prior art, reference is made by way of example to DE 10 2017 215 630 A1 and WO 2017/191023 A1.

WO 2017/191023 A1 relates to an independent wheel suspension with a leaf spring element as spring control arm, which extends at least approximately in a vehicle transverse direction and which, both at a vehicle body side and at a wheel carrier side, can be or is attached in each case rigidly and fixedly in terms of moments to an axle support or directly to the vehicle body. For the attachment of the leaf spring element fixedly in terms of moments, WO 2017/191023 A1 proposes the use of suitable clamping pieces, between which the leaf spring element can be clamped and which can be fastened to the axle support or vehicle body.

DE 10 2017 215 630 A1 discloses a generic independent wheel suspension with a leaf spring element as spring control arm, in the case of which the leaf spring element is attached to the wheel carrier by means of two rubber bearings and is thus rotatable or pivotable about an axis running in a vehicle longitudinal direction, wherein the independent wheel suspension described in DE 10 2017 215 630 A1 is suitable in particular for a front axle of a two-track vehicle because, in the case of such an axle, there is a toe-out tendency under braking and lateral forces and there is a toe-in tendency under drive force, such as is desirable at a front axle. This is because, in the case of the independent wheel suspension described in DE 10 2017 215 630 A1, a toe-out angle takes effect under braking and lateral forces owing to elastokinematic effects, in particular owing to the arrangement and design of the two rubber bearings by means of which the leaf spring element is attached to the wheel carrier, and a toe-in angle takes effect under drive force. That is to say, under braking and lateral forces, the independent wheel suspension described in DE 10 2017 215 630 A1 moves into a toe-out configuration owing to elastokinematic effects, and under drive force, this independent wheel suspension moves into a toe-in configuration.

At rear axles, however, an exactly opposite elastokinematic steering behavior of an independent wheel suspension is desired or necessary: instead of a toe-out tendency under braking and lateral forces, that is to say instead of an increase of the toe-out angle under braking and lateral forces, a toe-in tendency is desired, that is to say an increase of the toe-in angle. Likewise, a toe-out tendency under drive force is desired, that is to say an increase of the toe-out angle under drive force rather than an increase of the toe-in angle.

Since, at front axles, in particular at steerable front axles, the setting of an initial toe(-in) value is generally possible by means of corresponding variable-length track rods which are commonly present and by means of which the wheel carrier generally is or can be connected to a steering gear, there is generally no need to provide any further measures, in particular setting facilities, for toe angle setting purposes. This is however generally not the case at rear axles, in particular is not the case for non-actively steerable rear axles or corresponding independent wheel suspensions for such rear axles, because these generally have no corresponding adjustable-length track rods that could be utilized for setting the toe angle. The independent wheel suspension described in DE 10 2017 215 630 A1 also has no corresponding further measures or setting facilities for toe angle setting purposes.

Against this background, it is an object of the present invention to provide an alternative, in particular improved, independent wheel suspension and an alternative, in particular improved, axle for a two-track vehicle having such an independent wheel suspension, and an alternative, in particular improved, vehicle having such an independent wheel suspension.

This object is achieved by means of an independent wheel suspension, by means of an axle and by means of a vehicle having the features of the claimed invention. Advantageous and preferred embodiments of the invention are the subject of the further claims and will be discussed in more detail below. The wording of the claims is incorporated by express reference into the content of the description.

An independent wheel suspension according to the invention is characterized in that at least one rubber bearing is arranged such that, in relation to a functional installed state of the independent wheel suspension in a vehicle, the associated bearing axis of the rubber bearing is inclined by a defined inclination angle, which differs from 0°, about the vehicle vertical direction relative to the vehicle longitudinal direction. That is to say, according to the invention, at least one of the rubber bearings or the bearing axis thereof is inclined about the vehicle vertical direction relative to the vehicle longitudinal direction with an absolute angle of less than or greater than 0°, or by an angular amount of >0°.

In this way, assuming a corresponding arrangement of the rubber bearing and a corresponding selection of the inclination angle, it is possible to achieve an elastokinematic steering behavior that is desired in particular for a rear axle, in particular such that the toe-in angle increases under braking and lateral forces and the toe-out angle increases under drive force. That is to say, it is possible to provide an independent wheel suspension which, under braking and lateral forces, in particular elastokinematically moves into a toe-in configuration and, under drive forces, moves into a toe-out configuration, and thus an alternative, in particular improved, independent wheel suspension.

Since an independent wheel suspension according to the invention is, in principle, of fundamentally similar construction to the independent wheel suspension described in DE 10 2017 215 630 A1, it is possible in particular to provide an independent wheel suspension which is advantageous in particular for a rear axle or for use in a rear axle, and which furthermore has the advantages of the independent wheel suspension known from DE 10 2017 215 630 A1 (small number of components, small required structural space, whereby the independent wheel suspension is suitable in particular for highly electrified vehicle concepts, and reduced weight in relation to a conventional spring-strut-type axle).

The "inclination angle" relating to the bearing axes of the rubber bearings is to be understood in the context of the present invention to mean in each case the angle which, in a plane extending perpendicular to the vehicle vertical direction, is situated between the bearing axis and the vehicle longitudinal direction, in particular the in each case smaller angle between the bearing axis and the vehicle longitudinal direction.

Here, an independent wheel suspension according to the invention is suitable in particular for a merely elastokinematically and at least non-actively steerable axle of a vehicle, in particular for a rear axle of a two-track vehicle, in particular of a motor vehicle, particularly preferably for an axle of this type of a passenger motor vehicle. An independent wheel suspension according to the invention may however also, in particular in the case of a corresponding embodiment with in particular suitable inclination of at least one of the rubber bearings, be advantageously used on a steerable axle of a vehicle, for example a steerable front axle of a vehicle, in particular of a passenger motor vehicle.

The wheel carrier of an independent wheel suspension according to the invention is preferably designed for receiving, in particular for the fastening of, a vehicle wheel, and in the case of an embodiment of the independent wheel suspension according to the invention for a non-actively steerable axle, in particular a rear axle, is particularly preferably of single-part form. This allows a particularly simple embodiment of the wheel carrier, wherein the vibration damper is preferably attached in the region of its lower end to the wheel carrier and is in this case in particular rigid.

In an embodiment of the independent wheel suspension according to the invention for a steerable axle or an axle with in particular actively steerable vehicle wheels, for example for a front axle of a two-track motor vehicle, the wheel carrier of an independent wheel suspension according to the invention is, by contrast, preferably of two-part form, and is in particular designed in accordance with the so-called RevoKnuckle principle. In particular for a passenger motor vehicle, the wheel carrier is in this case particularly preferably formed in two parts with an integrated rotary steering axle and has a first wheel carrier part, which is jointly steerable, and a second wheel carrier part, which is guided by the leaf spring element and which is not jointly steerable, wherein the first wheel carrier part, which is jointly steerable, is in particular guided by the second wheel carrier part, which is not jointly steerable, and by a track rod. The vibration damper is preferably likewise attached, in particular likewise rigidly, to the wheel carrier, in particular to the wheel carrier part, which is not jointly steerable.

The vibration damper of an independent wheel suspension according to the invention is preferably designed, in each case in the conventional manner known from the prior art, as a telescopic vibration damper, such as is generally common for a vibration damper in the form of a damper strut.

The leaf spring element of an independent wheel suspension according to the invention, which owing to its wheel-guiding function can also be referred to as spring control arm, preferably has a wheel-carrier-side end region and a vehicle-body-side end region, wherein this leaf spring element, preferably, is attached by way of its wheel-carrier-side end region to the wheel carrier and can be attached by way of its vehicle-body-side end region to an axle support or directly to a vehicle body.

Here, a wheel-carrier-side end region refers here to that end region of the leaf spring element which, in relation to a functional installed state of the leaf spring element, faces toward the wheel carrier in the vehicle transverse direction, and a vehicle-body-side end region correspondingly refers to that end region of the leaf spring element which, in relation to a functional installed state of the independent wheel suspension according to the invention in a vehicle, faces toward the vehicle body or the attachment point in the vehicle transverse direction.

Here, the leaf spring element is particularly preferably of at least approximately areal form and is in particular attached or attachable only by way of its two end regions, that is to say in particular only by way of its wheel-carrier-side end region and its vehicle-body-side end region (in relation to the longitudinal extent of the leaf spring element in the vehicle transverse direction), specifically on the one hand to the wheel carrier and on the other hand to a vehicle body or to an axle support. In this way, particularly advantageous spring action and elastokinematics of the independent wheel suspension can be achieved.

Preferably, at least the wheel-carrier-side attachment points are situated below the height of the wheel center in the vehicle vertical direction. It is particularly preferably also the case that the leaf spring element is situated at least partially, preferably substantially, in particular entirely, in particular in the design situation, in the vehicle vertical direction below the wheel center, that is to say below a wheel axis of rotation, in relation to a functional installed state of the independent wheel suspension in a vehicle, but in particular so as to be high enough that it is situated, in particular at least partially, preferably substantially, in particular entirely, above a tire contour or a wheel-rim well. In this way, a sufficient ground clearance can be ensured.

As already mentioned in the introduction, the leaf spring element of an independent wheel suspension according to the invention has, in particular, a fiber composite material or is produced from a fiber composite material, in particular from a glass-fiber-reinforced plastic.

For a particularly simple wheel-carrier-side attachment and a particularly simple vehicle-body-side attachment of the leaf spring element fixedly in terms of moments to an axle support or directly to a vehicle body, the leaf spring element is configured in such a way, in particular the wheel-carrier-side end region and/or the vehicle-body-side end region of the leaf spring element are/is configured in such a way, that it can be fastened at least in force-fitting fashion, particularly preferably in force-fitting and form-fitting fashion, in particular in each case by means of a clamping device, to the wheel carrier or to an axle support or directly to a vehicle body, wherein the required clamping force can preferably be imparted by means of bolts, for example as proposed in the documents DE 10 2017 215 630 A1 or WO 2017/191023 A1 cited in the introduction.

Preferably, in the case of an independent wheel suspension according to the invention, the attachment to the wheel carrier is implemented here by means of a clamping device which is basically known from the prior art and by means of which, in particular, the rubber bearings are fastened to the leaf spring element. By means of a corresponding clamping device of this type, the leaf spring element can, at the wheel carrier side, be attached in a simple manner, with wheel-guiding and elastokinematic action, in particular so as to be rotatable or pivotable about the bearing axes of the rubber bearings, to the wheel carrier.

At the vehicle body side, the attachment may be realized preferably by means of a special, in particular force-fitting and form-fitting clamping means, which may be designed for example as described in WO 2017/191023 A1 or in a similar form, in particular with a different clamping geometry. By means of a corresponding clamping device of this type, the leaf spring element can, at the vehicle body side, be attached in a simple manner, fixedly in terms of moments and thus with a wheel-guiding action, to an axle support or directly to a vehicle body, such that the leaf spring element of an independent wheel suspension according to the invention can perform the function of a helical spring, arranged coaxially with respect to the vibration damper, of a conventional spring-strut-type axle, and can support not only the vertical forces arising between the vehicle body and the wheel carrier from the wheel load but also all external dynamic forces resulting from driving operation, such as drive forces, braking forces and lateral forces.

Here, the broadest possible support base, measured in the vehicle longitudinal direction, at the vehicle-body-side end of the leaf spring element is advantageous for the support of longitudinal forces and moments.

In the context of this invention, a "support base" refers in particular to the length of the associated side edge of the leaf spring element between the outermost attachment points, in particular in the vehicle longitudinal direction, in particular at the sides of the leaf spring element at or by means of which the leaf spring element is attached.

It has been found to be advantageous if the leaf spring element is in particular configured such that, at the vehicle body side, it has a support base, measured in the vehicle longitudinal direction, whose length corresponds at least to 0.4 times the length of the leaf spring element measured in the vehicle transverse direction. At the wheel carrier side, a corresponding support base may be smaller or of shorter length than the support base at the vehicle body side, for example approximately only half as large as the support base at the vehicle body side. If sufficient structural space is available, the wheel-carrier-side support base may however also be equal to or only slightly smaller than the body-side support base. In passenger motor vehicles, the size or length of the vehicle-body-side support base in this case preferably lies in a range from 250 mm to 400 mm, with preferably between 200 mm and 300 mm at the wheel carrier side, for the case of a non-steerable axle, in particular in the case of a rear axle, and is for example approximately 120 mm to 200 mm for a steerable axle, for example a steerable front axle, in particular owing to the space requirement of the (steerable) vehicle wheel.

The leaf spring element should furthermore also have a sufficient length, that is to say a sufficient extent, in the vehicle transverse direction, in relation to a functional installed state of the independent wheel suspension in a vehicle, in order to be able to provide a required deflection and rebound travel without the admissible loads being exceeded. Depending on the vehicle weight class, a length (in relation to the extent of the leaf spring element in the vehicle transverse direction in a functional installed state of an independent wheel suspension according to the invention in a vehicle) of the order of 350 mm to 550 mm appears to be advantageous in the case of passenger motor vehicles, in particular if, as has already been proposed in the introduction, the leaf spring element is formed from a fiber composite material and this is formed by a suitable plastics matrix and glass fibers as reinforcement fibers.

In some usage situations, it may furthermore be advantageous if at least one of the marginal regions, as viewed in the vehicle longitudinal direction, of the leaf spring element, that is to say of the wheel-guiding spring control arm, of a wheel suspension according to the invention is of reinforced design in relation to a section situated between these marginal regions in the vehicle longitudinal direction.

Here, "reinforced" means in particular that the thickness, measured in the vehicle vertical direction, of the leaf spring element is greater in the reinforced region than in a non-reinforced region, such that, preferably, the thickness of the leaf spring element is greater along at least one of its two edges than in a region between the edges.

Such a reinforcement may alternatively or additionally, in particular if the leaf spring element has a fiber composite material or is produced from a fiber composite material, be implemented by means of the reinforcement fibers provided in the fiber composite material, which in the reinforced region, in particular in the two marginal regions running in the vehicle transverse direction, run preferably unidirectionally and at least approximately in the vehicle transverse direction.

It has furthermore been found that it may be particularly advantageous if, between the two marginal regions, there is situated a relatively thin shear field in which layers of reinforcement fibers run at an angle of ±45° with respect to the vehicle transverse direction or vehicle longitudinal direction. Such a design of the leaf spring element makes it possible for the marginal regions of the leaf spring element, that is to say the edges which in a functional installed state of the leaf spring element extend in the vehicle transverse direction, accommodate substantially the tensile/compressive forces and bending moments that are to be transmitted, whereas the interposed shear field, as it is known, supports the torsional moments about the wheel axis of rotation.

Furthermore, it may be particularly advantageous if the so-called shear field, in particular its buckling characteristics, are designed in a targeted manner. In this way, in the case of an independent wheel suspension according to the invention, the steering behavior under the action of a braking moment can be set in targeted fashion. In particular, by means of the buckling behavior of the leaf spring element, the toe-in characteristics of the independent wheel suspension under braking force can be influenced and set within certain limits.

It has been found that, through the introduction of a small, pre-shaped bulge into the shear field at a targeted location, in particular by way of a preset deviation from a design of the plane of the shear field (between these leaf spring element marginal regions) which is completely planar (in a design situation), the buckling characteristics of the leaf spring element can be influenced in a particularly advantageous manner, wherein adequate stability of the leaf spring element under high loads must be ensured. Excessive deformation travels of the leaf spring element, and bending thereof away to one side, must be prevented.

In a further advantageous embodiment of an independent wheel suspension according to the invention, it is furthermore the case that a bend line of the leaf spring element is configured in accordance with a desired toe(-in) and camber behavior of the independent wheel suspension. Through the configuration of the bend line of the leaf spring element, the toe(-in) and camber behavior versus the spring travel can be influenced.

The bend line of the leaf spring element furthermore determines a change in track width during the deflection movement of a correspondingly configured vehicle axle with an independent wheel suspension designed in accordance with the invention on the left-hand side and on the right-hand side, wherein the change in track width should be selected not to be too great with regard to traction and straight-ahead driving characteristics.

By means of the moments about the vehicle longitudinal axis which are introducible at the side of the vehicle body via the attachment of the leaf spring element (spring control arm) fixedly in terms of moments, it is furthermore possible, in the case of an independent wheel suspension according to the invention installed at both sides at an axle in a vehicle, to achieve roll angle compensation during cornering if the bending moment, introduced into the vehicle body, of the leaf spring element at the outside of the corner becomes greater and that of the spring control arm or leaf spring element at the inside of the corner, that is to say of the leaf spring element at the inside of the corner, becomes smaller, so as to result in a sum moment that counteracts tilting of the body. A separate transverse stabilizer can thus be omitted, or a separate transverse stabilizer of this type is required at most only for the tuning of the self-steering behavior, and only at one of the axles of the vehicle.

In a preferred embodiment of an independent wheel suspension according to the invention, it is preferable if at least one of the rubber bearings is a so-called sleeve rubber bearing with an inner sleeve and an outer sleeve, between which, in particular, there is provided an elastomer ring which has a certain torsional stiffness (primarily of the order of 0.5 newton meters per degree of angular twist to 3 newton meters per degree of angular twist), wherein, preferably, one of the two sleeves is connected fixedly to the wheel carrier and the other of the two sleeves is connected fixedly to the leaf spring element, wherein the inner sleeve is in particular fixedly connected to the wheel carrier and the outer sleeve is in particular fixedly connected to the leaf spring element.

In one particularly advantageous embodiment of an independent wheel suspension according to the invention, the two rubber bearings in this case have different radial spring rates, that is to say different spring rates in a radial direction with respect to the bearing axis of the rubber bearings. If the independent wheel suspension according to the invention is provided for a rear axle of a, in particular two-axle, two-track vehicle, in particular for a motor vehicle, it has been found to be particularly advantageous if the further forwardly situated rubber bearing, which in particular is situated in front of a wheel center, that is to say in front of the wheel axis of rotation, as viewed in the vehicle longitudinal direction has a softer radial spring rate than the further rearwardly situated rubber bearing.

By contrast, if the independent wheel suspension according to the invention is provided for a front axle, in particular for a front axle of a preferably two-axle, two-track motor vehicle, it is advantageous if the further forwardly situated rubber bearing has a harder radial spring rate than the further rearwardly situated rubber bearing, which is in particular situated behind a wheel center.

All position and direction terms, such as in particular front, further forward, rear, further rearward, top, bottom, left, right, at the inside of the vehicle, at the outside of the vehicle, toward the inside of the vehicle, toward the outside of the vehicle, upward and downward relate here in each case, unless explicitly stated otherwise, to a functional installed state of an independent wheel suspension according to the invention in a vehicle.

A suitable distribution of the radial bearing hardness between the two rubber bearings allows in each case fine-tuning of the elastokinematics with regard to the toe(-in) characteristics of the independent wheel suspension. If an increasing toe-in angle under lateral force is desired, a relatively hard set-up of that rubber bearing which is situated further rearwardly in the direction of travel is expedient, whereas a toe-out tendency under lateral force can be achieved with a relatively hard set-up of the rubber bearing situated at the front.

Here, it is particularly preferable if the stiffnesses of the rubber bearings acting in an axial direction, that is to say the stiffnesses or spring rates acting in the direction of the bearing axis of the rubber bearings, are considerably lower than the radial spring stiffnesses. In this way, it is possible to achieve a particularly expedient longitudinal spring rate and thus good rolling comfort.

In some cases, it has proven to be particularly advantageous if an independent wheel suspension according to the invention is configured such that, in an installed state in a vehicle according to the invention, in the so-called design situation of the leaf spring element, in which there are no acting forces other than the weight forces of the vehicle body and a standard payload, a torsional moment acts at at least one of the rubber bearings, preferably at both of the rubber bearings, about the respectively associated bearing axes in the rubber bearings, such that, in this state, the wheel carrier is acted on with this torsional moment, wherein this torsional moment is particularly preferably oriented such that, with respect to the vibration damper, at least partial lateral force compensation is realized, that is to say in particular lateral force compensation at the vibration damper is realized. Here, the torsional moment is preferably applied during a process of joining of the leaf spring element including the rubber bearing to the wheel carrier, wherein, for this purpose, the leaf spring element is particularly preferably attached to the wheel carrier when the latter is situated in a suitably deflected position, such that the rubber bearing, after being attached to the wheel carrier, is correspondingly twisted during the partial rebound into the design situation, and imparts the corresponding torsional moment to the wheel carrier. The same applies to an alternative embodiment of an independent wheel suspension according to the invention in which one or both rubber bearings are arranged fixedly at the wheel carrier side and the inner sleeves thereof are connected, in a suitable deflected position, to the leaf spring element.

In a particularly advantageous embodiment of an independent wheel suspension according to the present invention, the leaf spring element is attached at the wheel carrier side to the wheel carrier by means of a further forwardly situated rubber bearing and by means of a further rearwardly situated rubber bearing, wherein, preferably, the bearing axes of the two rubber bearings, that is to say the bearing axis of the further forwardly situated rubber bearing and the bearing axis of the further rearwardly situated rubber bearing, are each inclined by a defined inclination angle, which differs from 0°, about the vehicle vertical direction relative to the vehicle longitudinal direction. Here, the two rubber bearings are particularly preferably inclined in each case in opposite directions. In this way, it is possible in a particularly simple manner to set a desired toe(-in) characteristic, in particular a toe(-in) characteristic which is advantageous for a rear axle, in particular under longitudinal force.

By means of such an inclination of the two rubber bearings about the vehicle vertical direction, a spring centroid can be generated to the outside of the vehicle, outside the wheel center or the wheel, about which spring centroid the wheel carrier rotates under longitudinal force, and which spring centroid thus defines a center of rotation. By means of a change in the inclination angles of the two rubber bearings, the position of the center of rotation can be shifted, whereby a toe(-in) change that results under longitudinal force can be realized.

Here, an inclination of the two rubber bearings such that the center of rotation that arises under acting longitudinal forces is situated outside the wheel center toward the outside of the vehicle, in particular outside the vehicle, in the vehicle transverse direction, in relation to a functional installed state of the independent wheel suspension in a vehicle, is particularly advantageous for a rear axle.

In the context of the present invention, a center of rotation is to be understood to mean the point which is defined by the point of intersection of the two respective center half-lines of the two rubber bearings, wherein, in the context of the present invention, a center half-line of a rubber bearing refers in each case to the straight line which runs perpendicularly to the associated bearing axis of the rubber bearing and through the associated bearing central point of the rubber bearing and which lies in a common plane with the bearing axis.

In a particularly advantageous embodiment of an independent wheel suspension according to the present invention, in particular in a refinement, the two rubber bearings are therefore arranged and configured, in particular inclined, such that, under acting longitudinal forces, an elastokinematic rotation of the wheel carrier about a center of rotation situated outside a wheel center in a vehicle transverse direction, in particular about an axis parallel to the vehicle vertical axis, is effected, wherein, in particular, the bearing axes of the two rubber bearings are each inclined about the vehicle vertical direction relative to the vehicle longitudinal direction. By means of such an inclination of the two rubber bearings, it is possible to achieve particularly advantageous elastokinematic steering characteristics, in particular toe(-in) characteristics of the independent wheel suspension under longitudinal force which are particularly advantageous for a rear axle.

By contrast, for a front axle, it has proven to be advantageous if the two rubber bearings are inclined such that, under acting longitudinal forces, an elastokinematic rotation of the wheel carrier about a center of rotation situated within a wheel center in the vehicle transverse direction, in particular about a center of rotation which is situated within the vehicle, particularly preferably within the wheel carrier (in the vehicle transverse direction), is effected. That is to say, preferably, in the case of an independent wheel suspension according to the invention that is provided for a front axle, the bearing axes of the two rubber bearings are inclined exactly oppositely, in order to achieve the opposite elastokinematic steering characteristics under longitudinal force that are desired for a front axle.

In a particularly preferred embodiment of an independent wheel suspension according to the present invention, the bearing axis of one of the two rubber bearings, in particular the bearing axis of the further forwardly situated rubber bearing, in particular if the independent wheel suspension is provided for a rear axle, is inclined toward the outside of the vehicle, in relation to a plan view, in a direction of travel, of the independent wheel suspension in a functional installed state in a vehicle. In this way, in particular if the further forwardly situated rubber bearing is inclined toward the outside of the vehicle, a center of rotation which lies outside the wheel center in the vehicle transverse direction can be set in a simple manner.

By contrast, if an independent wheel suspension according to the invention is provided for a front axle, it is preferably the case that the further rearwardly situated rubber bearing is inclined toward the outside of the vehicle.

In a further preferred embodiment of an independent wheel suspension according to the present invention, in particular in a refinement, the bearing axis of one of the two rubber bearings, in particular the bearing axis of the other rubber bearing, particularly preferably the bearing axis of the further rearwardly situated rubber bearing, in particular in the case of an independent wheel suspension for a rear axle, is inclined toward the inside of the vehicle, in relation to a plan view, in a direction of travel, of the independent wheel suspension in a functional installed state in a vehicle. In this way, it is possible in a simple manner, in particular if the further rearwardly situated rubber bearing is inclined toward the inside of the vehicle, to set a center of rotation which is situated outside the wheel center in the vehicle transverse direction.

It is particularly preferable, in particular if the independent wheel suspension is provided for a rear axle, if the further forwardly situated rubber bearing is inclined toward the outside of the vehicle and the further rearwardly situated rubber bearing is inclined toward the inside of the vehicle. For a front axle, it is preferably correspondingly the case that the further forwardly situated rubber bearing is inclined toward the inside of the vehicle and the further rearwardly situated rubber bearing is inclined toward the outside of the vehicle. In this way, an advantageous position of the center of rotation can be achieved in each case in a particularly simple manner.

It is also conceivable for only one of the rubber bearings to be inclined about the vehicle vertical direction and for the other rubber bearing to be arranged such that its bearing axis extends in the vehicle longitudinal direction. This may in some cases be sufficient or even advantageous.

Since the leaf spring element is preferably arranged at least partially below the wheel center or below the wheel axis of rotation, this applying in particular to the entire leaf spring element, the center of rotation is likewise preferably situated below the wheel center or the wheel axis of rotation in the vehicle vertical direction.

For many cases, it has proven expedient, in particular if the leaf spring element is arranged such that its center of area and/or a longitudinal central plane, running in the vehicle transverse direction, of the leaf spring element, is situated at the height of the wheel center or of the wheel axis of rotation in the vehicle longitudinal direction, if the associated bearing axes of the two rubber bearings are inclined such that a center of rotation is set which, in the vehicle longitudinal direction, lies at least approximately at the height of the wheel center, in particular exactly at the height of the wheel center, such that the center of rotation lies in a plane which extends in the vehicle transverse direction and vehicle vertical direction and which runs through the wheel center or along a wheel axis of rotation and which is perpendicular to the roadway.

A resulting center of rotation may however basically also be situated in front of or behind the wheel center or the wheel axis of rotation in the vehicle longitudinal direction, wherein, if the independent wheel suspension is provided for a rear axle, it has been found to be more advantageous if the center of rotation is then rather situated behind the wheel center, because, in this way, the elastokinematic steering characteristics, in particular the toe(-in) characteristics of the independent wheel suspension under lateral force can be influenced more advantageously owing to the higher radial load and thus deformation of the front rubber bearing in the direction of toe-in under lateral force.

Here, the leaf spring element may be of symmetrical configuration along its length, that is to say with respect to a plane of symmetry running in the vehicle transverse direction (in relation to an installed state of the independent wheel suspension in a vehicle), or asymmetrical.

For many cases, it has however proven advantageous if the leaf spring element is configured to be symmetrical with respect to a line or plane of symmetry running in the vehicle transverse direction and through the wheel center, and a longitudinal central plane, running in the vehicle transverse direction and extending in the vehicle vertical direction, of the leaf spring element runs through the wheel center, wherein, in particular, a trapezoidal leaf spring element with a relatively short wheel-carrier-side side edge and a relatively long vehicle-body-side side edge has proven to be advantageous.

In particular if the leaf spring element is of symmetrical form with respect to an axis of symmetry or plane of symmetry running in the vehicle transverse direction, it is preferably the case that the two bearing axes of the two rubber bearings are each inclined by the same angular amount with respect to the vehicle longitudinal direction, wherein the bearing points of the two rubber bearings are furthermore particularly preferably arranged in each case symmetrically, in the vehicle longitudinal direction, with respect to the wheel center or with respect to the wheel axis of rotation, that is to say with the same spacing to the wheel center in the vehicle longitudinal direction. In this way, under longitudinal force, it is possible to achieve uniform loading of the two rubber bearings and a uniform cardanic angle of twist during deflection and rebound. It is however also basically possible for the bearing axes of the two rubber bearings to be inclined by different angular amounts, that is to say asymmetrically, and/or arranged with different spacings of their bearing central points to the wheel center or to the wheel axis of rotation in the vehicle longitudinal direction.

The magnitude of the inclination angles of the two rubber bearings is preferably selected such that a sufficient, in particular the desired, toe(-in) change under longitudinal force occurs, wherein the inclination angle should be selected to be neither too small nor too large.

Inclination angles which are too small exhibit an insufficient action with regard to the desired toe(-in) correction; by contrast, inclination angles which are too large lead to significant components of the longitudinal force being supported in the radial directions of the rubber bearings, with the high stiffnesses thereof. This then reduces the axial displacements in the rubber bearings that are required for the desired toe(-in) correction.

Aside from the inclination angle, it is furthermore in particular the case that the wheel-carrier-side support base, that is to say the spacing of the attachment points of the two rubber bearings, in particular of the rubber bearing central points, in the vehicle longitudinal direction, or the length of the side edge of the leaf spring element between the attachment points of the rubber bearings, has an influence on the radial loads on the rubber bearings under longitudinal forces. A large wheel-carrier-side support base generates low radial forces, wherein these in turn cause small radial deformations and correspondingly relatively small toe(-in) changes. Thus, even only a small toe(-in) correction by means of the above-described inclination of the rubber bearings is necessary. It must however be taken into consideration that a large wheel-carrier-side support base shifts the ideal center of rotation further away toward the outside of the vehicle, and thus, for the same axial deformation travels of the rubber bearings, the angle of the toe(-in) correction becomes smaller. It is thus necessary to seek a suitable compromise between the two opposing effects. The available structural space in the wheel rim of a vehicle wheel mounted in a functional installed state of the independent wheel suspension in a vehicle additionally plays a role: the higher the rubber bearings are positioned, the greater the wheel-carrier-side support base can be selected to be, because, with increasing height (up to the wheel center), the inner diameter of the wheel rim increases. However, the higher the wheel-carrier-side attachment points, that is to say the rubber bearings, are arranged, the greater the level of force in the rubber bearings when supporting lateral forces, such that it has been found to be a suitable compromise if the rubber bearings are arranged as low as possible, in particular in the vicinity of the ground clearance, and make the most extensive possible use of the structural space of the wheel rim that is available here in the vehicle longitudinal direction for as large a support base as possible.

It has proven to be particularly advantageous if a magnitude of at least one inclination angle of at least one bearing axis is at least 3°, 5° or 7.5° and at most 15°, 12.5° or 11°, wherein the magnitude of at least one inclination angle is in particular 10°. In this way, it is possible to realize an independent wheel suspension according to the invention which has particularly advantageous toe(-in) characteristics, in particular with particularly advantageous elastokinematic steering characteristics under longitudinal force. In particular in conjunction with a wheel-carrier-side support base of 200 mm to 300 mm, it is possible with the above-stated angular amounts for the inclination angle to achieve particularly advantageous toe(-in) correction under longitudinal force, in particular for a rear axle.

It is particularly preferable here if the magnitudes of the inclination angles of both bearing axes are each at least 3°, 5° or 7.5° and at most in each case 15°, 12.5° or 11°, in particular in each case 10°. That is to say, it is particularly preferable if both bearing axes are inclined by such an angular amount. In particular if the independent wheel suspension is provided for a rear axle, it has proven to be advantageous if the bearing axis of the further forwardly situated rubber bearing is inclined by an absolute inclination angle of −10°, and thus toward the outside of the vehicle, about the vehicle vertical direction relative to the vehicle longitudinal direction, and the bearing axis of the rear rubber bearing is inclined by an absolute inclination angle of +10°, and thus toward the inside of the vehicle. Such an inclination of the rubber bearings or of the associated bearing axes has in particular proven to be a suitable compromise, because, on the one hand, this leads to a center of rotation which is situated sufficiently close to the wheel center and to the outside of the vehicle and thus leads to advantageous, in particular the desired, toe(-in) correction, but on the other hand, at the same time, the radial loads on the two rubber bearings under longitudinal force do not become too great.

For a front axle, correspondingly opposite inclination angles appear to be particularly advantageous. That is to say, in the case of an independent wheel suspension according to the invention for a front axle, it is preferably the case that the further forwardly situated rubber bearing is inclined by an absolute inclination angle of +10°, and thus toward the inside of the vehicle, and the further rearwardly situated rubber bearing is inclined in particular by −10°, and thus toward the outside of the vehicle.

In one advantageous embodiment of an independent wheel suspension according to the invention, the bearing centerpoints of the two rubber bearings are in this case preferably arranged at least approximately one behind the other in the vehicle longitudinal direction or along a common straight line running in the vehicle longitudinal direction. In an alternative embodiment of an independent wheel suspension according to the invention, the bearing centerpoints of the two rubber bearings may however also be arranged offset with respect to one another in the vehicle transverse direction, wherein, for a rear axle, the bearing centerpoint of the further rearwardly situated rubber bearing is preferably arranged so as to be offset further in the direction of the outside of the vehicle in the vehicle transverse direction. By contrast, for a front axle, it appears to be advantageous if the further forwardly situated rubber bearing is arranged so as to be offset in the direction of the outside of the vehicle in the vehicle transverse direction.

Here, the wheel-carrier-side side edge of the leaf spring element and the vehicle-body-side side edge of the leaf spring element may, in particular in both cases, that is to say irrespective of whether or not the bearing centerpoints of the two rubber bearings are arranged offset with respect to one another in the vehicle transverse direction, run parallel to one another and in particular extend in each case in the vehicle longitudinal direction, or else extend obliquely with respect to one another and/or obliquely with respect to the vehicle longitudinal direction.

Furthermore, the bearing centerpoints of the two rubber bearings may, in particular alternatively or additionally, also be arranged offset with respect to one another in the vehicle vertical direction. In this way, the inclination of the toe(-in) curve versus the wheel lift can be influenced, wherein a front rubber bearing which is situated higher has an understeer-imparting influence, that is to say imparts more toe-in during the deflection movement.

In a further possible embodiment, which in some cases is advantageous, of an independent wheel suspension according to the present invention, it is therefore the case that the bearing centerpoints of the two rubber bearings are arranged offset in the vehicle vertical direction, such that a straight line running through the bearing centerpoints of the two rubber bearings runs obliquely with respect to a plane extending perpendicular to the vehicle vertical direction, wherein, in particular if the independent wheel suspension is provided for a rear axle, it is preferably the case that the bearing centerpoint of the further forwardly situated rubber bearing is situated higher, in the vehicle vertical direction, than the bearing centerpoint of the further rearwardly situated rubber bearing, such that the straight line in this case slopes downward in particular in the direction of the rear of the vehicle. That is to say, in the case of a rear axle, it is preferably the case that the further forwardly situated rubber bearing is situated higher. For a front axle, it is correspondingly preferably the case that the further rearwardly situated rubber bearing is arranged higher, that is to say so as to be offset upward in the vehicle vertical direction relative to the further forwardly situated rubber bearing.

It is basically possible for the bearing axes of the two rubber bearings to each run horizontally, that is to say to be oriented parallel to a plane extending perpendicular to the vehicle vertical direction, or, in particular additionally, to run so as to be inclined at an angle with respect to a horizontal plane, wherein one or both bearing axes may be inclined with respect to a horizontal plane.

In a particularly advantageous embodiment of an independent wheel suspension according to the present invention, at least one of the two bearing axes additionally runs so as to be tilted by a defined angle relative to a horizontal plane, wherein, preferably, one or both bearing axes run so as to be tilted relative to a horizontal plane. This results in two center half-lines which are each perpendicular to the bolt connection axes (bearing axes) of the rubber bearings and run through the centerpoints of the rubber bearings, wherein the point of intersection of these two center half-lines defines a center of rotation about which, in a functional installed state of the independent wheel suspension in a vehicle, the associated wheel rotates under acting longitudinal forces, for example owing to a braking force acting in the longitudinal direction during braking. In this way, it is possible to provide an independent wheel suspension which has particularly advantageous elastokinematics under longitudinal forces.

If one or both bearing axes are not only inclined according to the invention about the vehicle vertical direction and relative to the vehicle longitudinal direction but additionally also with respect to a horizontal plane, it has proven particularly advantageous, in particular in the case of an independent wheel suspension that is provided for a rear axle, if one or both rubber bearings are inclined such that the center of rotation that arises in this case, that is to say the point of intersection of the two center half-lines of the two rubber bearings, lies in the roadway plane or below the roadway plane in relation to a functional installed state in a vehicle in at least one state of the independent wheel suspension, in particular in the design situation.

In this way, it is possible to provide an independent wheel suspension which is particularly advantageous under longitudinal force, in particular an independent wheel suspension with a low so-called windup tendency. During braking, the moment composed of braking force and supporting force in the rubber bearings of spring control arms and dampers gives rise to an angle of twist about the axis of rotation owing to the elasticities in the wheel suspension. This angle of twist, also referred to as windup, can lead to stick-slip effects in the tire contact patch and consequently to resonance phenomena, with high component loads. If the line of action of the braking force runs exactly through the center of rotation, there is theoretically no resulting angle of twist, because the lever arm of the braking force that acts at the tire-contact point to the center of rotation is in this case zero. In practice, this two-dimensional consideration does not apply exactly, but can reduce the windup tendency of the wheel suspension owing to the tilt of the rubber bearings with respect to the horizontal. With regard to the cardanic angles that arise during the deflection and rebound movements, it is particularly advantageous if the angle of tilt of one or both rubber bearings with respect to the horizontal is selected such that the resulting center of rotation lies not in the roadway plane but slightly below the roadway plane. The center of rotation thus lies slightly lower than the tire-contact point, whereby, although a small lever is present (because the braking force no longer runs through the center of rotation), an advantageous reduction of the windup tendency can however still be achieved. The angles of tilt of the rubber bearings in this case preferably lie between 10° and 30°, in particular between 10 and 25°, wherein an angle of tilt of 15° at each of the two rubber bearings has proven to be particularly advantageous.

Here, it is particularly preferable if, in the case of a rear axle, the bearing axis of the further forwardly situated rubber bearing runs obliquely upward toward the rear, whereas the bearing axis of the rear rubber bearing in particular slopes downward toward the rear. This orientation of the bearing axes also appears to be advantageous in the case of a front axle, and also, in the case of a front axle, can lead to a reduction of the windup tendency.

In one embodiment of an independent wheel suspension for a two-track vehicle, in particular for a rear axle of a two-track vehicle, according to a further invention, the independent wheel suspension is basically designed according to the present invention, but contrary to the present invention, neither of the two rubber bearings needs to be inclined by a corresponding inclination angle about the vehicle vertical direction and relative to the vehicle longitudinal direction, it rather merely being the case that at least one rubber bearing is inclined with respect to the horizontal, in particular both.

That is to say, an independent wheel suspension according to the further invention preferably has a wheel carrier, a vibration damper configured and arranged in the manner of a damper strut, and a leaf spring element which, in particular, has a fiber composite material or is produced from a fiber composite material, wherein the leaf spring element is oriented at least approximately in a vehicle transverse direction and is configured to perform a suspension function and, together with the vibration damper, wheel guidance of a vehicle wheel which is fastened to the wheel carrier in a functional installed state of the independent wheel suspension in a vehicle, and wherein the leaf spring element is attached at a wheel carrier side to the wheel carrier by means of two rubber bearings with in each case one bearing axis and one bearing centerpoint, and in each case so as to be rotatable about the associated bearing axes of the rubber bearings, and is configured to be attached, at a vehicle body side, fixedly in terms of moments to an axle support and/or directly to a vehicle body, wherein the independent wheel suspension is in particular characterized in that at least one rubber bearing is arranged such that, in relation to a functional installed state of the independent wheel suspension in a vehicle, the associated bearing axis of the rubber bearing is tilted relative to the horizontal. That is to say, according to the invention, at least one of the rubber bearings or the bearing axis thereof is tilted relative to the horizontal, in particular by an absolute angle of less than or greater than 0°, or by an angular amount of >0°. Furthermore, all features that have been described in conjunction with the present invention may be realized in an independent wheel suspension according to the described further invention.

An effect similar to that of an offset of the two bearing centerpoints of the two rubber bearings in the vehicle vertical direction, that is to say likewise an influencing of the toe(-in) curve versus the wheel lift, in particular in a similar manner, is obtained by means of a warping of the two side edges of the wheel-carrier-side end region and of the vehicle-body-side end region of the leaf spring element with respect to one another, in particular a warping generated during the installation of the leaf spring element, wherein the leaf spring element is particularly preferably attached in a warped manner to the wheel carrier, because, in this way, it is likewise possible to realize a height offset between the front and the rear wheel-carrier-side end or the marginal regions, that is to say the longitudinal edges, of the leaf spring element.

For this purpose, it is particularly preferable if the leaf spring element is configured correspondingly, in particular is produced in already warped form, wherein, for this purpose, it is preferable if a wheel-carrier-side side edge and a vehicle-body-side side edge of the leaf spring element, in an unloaded state, in particular in a state not installed in an independent wheel suspension, do not run parallel but run obliquely with respect to one another with a defined warp angle in between, in particular in relation to a projection of the side edges in a horizontal plane.

Such an embodiment of the leaf spring element generally leads, depending on the position of the attachment points of the rubber bearings or the embodiment of the wheel-carrier-side fastening of the leaf spring element, to a greater or lesser degree of bracing, in particular to warping, of the leaf spring element during the installation process, in particular if the rubber bearings are arranged with their bearing centerpoints such that these are arranged so as to lie one behind the other in the vehicle longitudinal direction, whereby the elastokinematics can be advantageously influenced. In particular, in this way, it is possible to achieve a targeted change in the inclination of the toe(-in) curve versus the wheel lift. It is thus possible in a simple manner, in particular through a variation of the embodiment of the leaf spring element or by means of an exchange of the leaf spring element, to influence, in particular set, the toe(-in) curve versus the wheel lift.

In the case of an independent wheel suspension for a rear axle, it has proven to be advantageous if, in an unloaded, uninstalled state of the leaf spring element, that is to say as an individual part, that end of the wheel-carrier-side side edge of the leaf spring element which is situated further to the rear in the vehicle longitudinal direction is in this case situated further to the outside than that end of the wheel-carrier-side side edge of the leaf spring element which is situated further to the front in the vehicle longitudinal direction. For a front axle, it appears that a correspondingly reversed situation applies, that is to say, in the case of a front axle, it appears advantageous if that end of the wheel-carrier-side side edge of the leaf spring element which is situated further to the front in the vehicle longitudinal direction is situated further to the outside.

It has been found that, in many cases, it is particularly advantageous if the measure of the warping is combined with an offset of the bearing centerpoints of the rubber bearings in the vehicle vertical direction, because, in this way, the toe(-in) curve versus the wheel lift can be set in a particularly fine and targeted and flexible manner.

In order to contribute to a reduction of vehicle pitch angles under longitudinal force, it is furthermore proposed, in particular as an alternative or in addition to an offset of the bearing centerpoint in the vehicle vertical direction and/or a warping of the leaf spring element, that the vehicle-body-side attachment of the wheel-guiding leaf spring element be set obliquely, that is to say tilted about the horizontal (in relation to a side view), such that the leaf spring element, as seen in the vehicle transverse direction, can be attached to the vehicle body so as to be tilted in the vehicle longitudinal direction in relation to a horizontal plane. With this measure, a resultant path of the tire-contact point or of the wheel centerpoint during deflection and rebound is obtained which is likewise oblique and which thus corresponds to the launching and braking support angles that are known from the kinematic analysis of wheel suspensions.

To allow for superposed twisting movements of the leaf spring element about the vehicle transverse direction during deflection and rebound movements, the inclination of the leaf spring element at the vehicle body side with respect to the horizontal, that is to say the obliquity, should however be limited to values between 0° and 10°. It has proven advantageous if the leaf spring element, in an independent wheel suspension that is provided for a rear axle, is inclined so as to slope downward toward the rear by approximately 4° to 7° and, in the case of a front axle, is inclined or tilted so as to rise upward toward the rear by approximately 3° to 5°.

For many cases, it has basically proven advantageous here if the leaf spring element is arranged in each case with its center of area at the height of a wheel center, that is to say at the height of the wheel axis of rotation, in the vehicle longitudinal direction.

It has however been found that, with regard to the elastokinematics steering characteristics of the independent wheel suspension under lateral force, it is in some cases particularly advantageous, specifically if an independent wheel suspension according to the invention is provided for use in a rear axle, if the leaf spring element, preferably together with its wheel-carrier-side and vehicle-body-side attachment points, is offset in the vehicle longitudinal direction toward the rear of the vehicle, that is to say rearward. It has proven to be particularly advantageous if the leaf spring element together with all of its attachment points, that is to say as a complete leaf spring element assembly, is offset toward the rear of the vehicle in particular by at least 5 mm and at most by 50 mm, such that, preferably, a center of area of the leaf spring element and/or a longitudinal central plane of the leaf spring element is situated behind a wheel center or the wheel axis of rotation in the vehicle longitudinal direction, in particular by at least 5 mm and at most 50 mm, because, with these values, in the case of conventional variation widths of the pneumatic trail (in the case of passenger motor vehicles), it is generally possible to achieve acceptable toe(-in) values under lateral force.

Furthermore, the toe(-in) and camber characteristics of an independent wheel suspension according to the invention versus the spring travel or the wheel lift can furthermore be set in targeted fashion through the arrangement of the wheel-guiding vibration damper, in particular by means of the tilt thereof in the vehicle transverse direction and the position of the attachment points in the vehicle longitudinal direction, wherein a high degree of damper tilt, that is to say a steep inclination of the vibration damper obliquely upward toward the inside of the vehicle proceeding from its lower attachment point, is associated with a high camber gradient of a vehicle wheel fastened to the wheel carrier and is thus particularly advantageous, because an increase in negative camber during the deflection movement is basically desired. In particular, through the obliquity of the wheel-guiding damper as described above, that is to say upward toward the inside of the vehicle in the vehicle transverse direction, as seen in the view from the rear, it is possible to influence a transverse center spacing such that a sufficient increase in negative camber during the deflection movement is achieved. In this way, even under high lateral forces and the associated loss of camber, it is still ensured that a camber value which is expedient for the transmission of the lateral forces is present relative to the road. Here, the vibration damper is preferably tilted in the vehicle transverse direction toward the inside of the vehicle, that is to say exactly in the vehicle transverse direction. The vibration damper may however also be tilted obliquely upward toward the front or obliquely upward toward the rear in the direction of the inside of the vehicle. By means of the positioning of the vehicle-body-side attachment point of the vibration damper further forward in the vehicle longitudinal direction than the wheel-carrier-side attachment point, exactly in the vehicle transverse direction, or further rearward than the wheel-carrier-side attachment point, it is possible to influence a longitudinal force component of the forces introduced into the body via the support bearing, in particular a longitudinal force component of the (high) additional spring forces introduced via the support bearing into the bodyshell, wherein, in the case of a rear axle, the vibration damper is preferably arranged in the vehicle transverse direction because, in the case of such an arrangement, no longitudinal force component of the (high) additional spring forces is introduced into the support bearing, and these therefore also do not need to be supported by the rubber bearings. If a structural space required for this is not available, the next selection of the arrangement is preferably an arrangement tilted obliquely upward toward the rear.

Aside from the required camber progression, a positioning of the support bearing as close as possible to the vehicle wheel or an associated snow chain skid contour is advantageous in order to reduce an offset between wheel load and support bearing force and thus a moment about the longitudinal axis, the support of which exerts high radial forces on the two rubber bearings by means of which the spring control arm, that is to say the leaf spring element, is attached at the wheel carrier side to the wheel carrier.

For the independent wheel suspension according to the invention, it has furthermore proven advantageous, in particular with regard to the toe(-in) curve versus the wheel lift, if the vibration damper is arranged in front of a wheel center or in front of the wheel axis of rotation and in particular is attached by way of its lower attachment point in front of a wheel center, because this arrangement has an understeer-imparting action, which is advantageous in particular if the independent wheel suspension is provided for use in a rear axle. A positive side-effect of this arrangement is furthermore, in particular in the case of a passenger motor vehicle, that the occurring high additional spring forces can be introduced (in the case of a rear axle) at a relatively stiff point of the bodyshell structure close to a so-called torsion ring, which is commonly formed from the rear transverse member, the spring support and the rear shelf or the rear window frame of a corresponding vehicle.

Furthermore, in particular with regard to the smallest possible structural height of an independent wheel suspension according to the invention, also in the case of a driveable vehicle wheel, it is proposed that the vibration damper be arranged adjacent to the driveshaft or adjacent to a wheel center, with its bottom edge spaced apart from the leaf spring element in the vehicle vertical direction by a distance that is particularly preferably no greater than a diameter of the vibration damper.

In a further advantageous embodiment of an independent wheel suspension according to the present invention, at least one rubber bearing, preferably both rubber bearings, by means of which the leaf spring element is attached at a wheel carrier side to the wheel carrier, has an axial stop for limiting an axial deformation travel of the rubber bearing, wherein the axial stop is preferably configured to limit an axial deformation travel of the rubber bearing that is caused by a longitudinal force acting in the direction of the rear of the vehicle, in particular an axial deformation travel of the rubber bearing that is caused by a braking force acting in the direction of the rear of the vehicle. It is particularly preferable if the maximum possible deformation travel, limited by the axial stop, of the rubber bearing in an axial direction, in particular of at least one rubber bearing, preferably of both rubber bearings, is configured here such that an axial deformation travel caused by a drive force acting in the direction of the front of the vehicle is not limited, such a limitation applying only to an axial deformation resulting from a braking force acting in the direction of the rear of the vehicle and which exceeds a defined value, which is in particular greater than a maximum possible drive force acting in the direction of the front of the vehicle.

In this way, it can be achieved in a simple manner that, even for the load situation of braking, in which rearwardly directed axial forces acting in the two wheel-carrier-side rubber bearings are higher than forwardly directed axial forces in the drive situation (because in both cases the reaction force at the support bearing points rearward), advantageous elastokinematic steering characteristics, in particular advantageous toe(-in) characteristics, of the independent wheel suspension are realized. In particular, by means of this measure, it is possible to avoid the rubber bearings deforming more intensely in an axial direction, and thus causing a relatively great toe(-in) change, under braking force.

It is particularly preferable if both rubber bearings each have, in particular at their further forwardly situated end, an axial stop and in particular additionally an axial stop buffer, preferably an axial stop provided with an elastomer as stop buffer, which axial stop can, in the presence of relatively high axial forces, be supported on the wheel carrier, so as to result in particular in a steep progression of an axial spring characteristic curve in the rubber bearing.

It is particularly preferable if, for this purpose, the wheel carrier has a correspondingly configured stop surface against which the axial stop of at least one rubber bearing, preferably the axial stops of both rubber bearings, can be supported when the maximum admissible deformation travel under longitudinal force, in particular in the load situation of braking, is reached.

In the other direction, that is to say at the rear end of the two rubber bearings, in the case of an independent wheel suspension according to the present invention, it is preferably the case that no stop is provided, in particular in the case of a rear axle, such that the entire axial deformation travel of the rubber bearings is available for a toe(-in) change, in particular in the direction of toe-out.

In one embodiment of an independent wheel suspension for a two-track vehicle, in particular for a rear axle of a two-track vehicle, according to a second further invention, the independent wheel suspension is basically designed according to the present invention, but contrary to the present invention, neither of the two rubber bearings needs to be inclined by a corresponding inclination angle about the vehicle vertical direction and relative to the vehicle longitudinal direction, and has at least one rubber bearing which has an axial stop for limiting an axial deformation travel of the rubber bearing, in particular as described above, wherein, preferably, both rubber bearings have an axial stop.

That is to say, an independent wheel suspension according to the second further invention preferably has a wheel carrier, a vibration damper configured and arranged in the manner of a damper strut, and a leaf spring element which, in particular, has a fiber composite material or is produced from a fiber composite material, wherein the leaf spring element is oriented at least approximately in a vehicle transverse direction and is configured to perform a suspension function and, together with the vibration damper, wheel guidance of a vehicle wheel which is fastened to the wheel carrier in a functional installed state of the independent wheel suspension in a vehicle, and wherein the leaf spring element is attached at a wheel carrier side to the wheel carrier by means of two rubber bearings with in each case one bearing axis and one bearing centerpoint, and in each case so as to be rotatable about the associated bearing axes of the rubber bearings, and is configured to be attached, at a vehicle body side, fixedly in terms of moments to an axle support and/or directly to a vehicle body, wherein the independent wheel suspension is in particular characterized in that at least one rubber bearing, preferably both rubber bearings, has an axial stop for limiting an axial deformation travel of the rubber bearing, wherein the axial stop is preferably configured to limit an axial deformation travel of the rubber bearing that is caused by a longitudinal force acting in the direction of the rear of the vehicle, in particular an axial deformation travel of the rubber bearing that is caused by a braking force acting in the direction of the rear of the vehicle. Furthermore, all features that have been described in conjunction with the present invention may be realized in an independent wheel suspension according to the described second further invention.

In the case of an independent wheel suspension according to the invention, it is preferably the case, as is conventional in the prior art, that at least one rubber bearing by means of which the leaf spring element is attached at the wheel carrier side to the wheel carrier, preferably both rubber bearings, is/are fastened by means of a bolt connection, in particular a bolt-nut connection, to the wheel carrier, wherein, in one advantageous embodiment of an independent wheel suspension according to the present invention, at least one rubber bearing, preferably the further forwardly situated rubber bearing, is fastened to the wheel carrier by means of an eccentric bolt, in particular such that a defined toe(-in) angle, in particular a defined initial toe-in angle (in relation to the design situation), can be set by rotation of the eccentric bolt about its longitudinal axis. This is particularly advantageous if the independent wheel suspension is provided for a rear axle because, as already mentioned in the introduction, additional measures are otherwise required for toe(-in) setting purposes. In this way, a toe-in setting can be made possible in a simple manner, in particular with a corresponding embodiment of eccentric bolt and wheel carrier.

In a further advantageous embodiment of an independent wheel suspension according to the present invention, in particular in a refinement, the eccentric bolt is in this case supported on the wheel carrier, and the wheel carrier is configured such that a displacement of the wheel carrier in the region of the attachment of the rubber bearing in the vehicle transverse direction can be effected by means of a rotation of the eccentric bolt. In this way, a toe-in setting can be made possible in a simple manner, in particular with a corresponding embodiment of eccentric bolt and wheel carrier.

In one embodiment of an independent wheel suspension for a two-track vehicle, in particular for a rear axle of a two-track vehicle, according to a third further invention, the independent wheel suspension is basically designed according to the present invention, but contrary to the present invention, neither of the two rubber bearings needs to be inclined by a corresponding inclination angle about the vehicle vertical direction and relative to the vehicle longitudinal direction, and characterized in that at least one rubber bearing, preferably the further forwardly situated rubber bearing, is fastened to the wheel carrier by means of an eccentric bolt, in particular such that a defined toe(-in) angle, in particular a defined initial toe-in angle (in relation to the design situation), can be set by rotation of the eccentric bolt about its longitudinal axis, in particular as described above.

That is to say, an independent wheel suspension according to the third further invention preferably has a wheel carrier, a vibration damper configured and arranged in the manner of a damper strut, and a leaf spring element which, in particular, has a fiber composite material or is produced from a fiber composite material, wherein the leaf spring element is oriented at least approximately in a vehicle transverse direction and is configured to perform a suspension function and, together with the vibration damper, wheel guidance of a vehicle wheel which is fastened to the wheel carrier in a functional installed state of the independent wheel suspension in a vehicle, and wherein the leaf spring element is attached at a wheel carrier side to the wheel carrier by means of two rubber bearings with in each case one bearing axis and one bearing centerpoint, and in each case so as to be rotatable about the associated bearing axes of the rubber bearings, and is configured to be attached, at a vehicle body side, fixedly in terms of moments to an axle support and/or directly to a vehicle body, wherein the independent wheel suspension is in particular characterized in that at least one rubber bearing, preferably the further forwardly situated rubber bearing, is fastened to the wheel carrier by means of an eccentric bolt, in particular such that a defined toe(-in) angle, in particular a defined initial toe-in angle (in relation to the design situation), can be set by rotation of the eccentric bolt about its longitudinal axis, in particular as described above. Furthermore, all features that have been described in conjunction with the present invention may be realized in an independent wheel suspension according to the described third further invention.

For the attachment of the leaf spring element to an axle support or to the vehicle body, that is to say for the vehicle-body-side attachment, a clamping means is proposed, as already mentioned in the introduction. This clamping means may basically be designed for example as in WO 2017/191023 A1, already cited in the introduction. It has however been found that, with a different embodiment of the vehicle-body-side end region of the leaf spring element, it is possible to achieve a clamping means which is improved in relation to the clamping means described in WO 2017/191023 A1.

For this purpose, in a particularly advantageous embodiment of an independent wheel suspension according to the present invention, the leaf spring element may be attached at the vehicle body side, in particular fixedly in terms of moments by a force-fitting and form-fitting clamping means, to an axle support or directly to a vehicle body, wherein a vehicle-body-side end region of the leaf spring element preferably has, for this purpose, an undulating contour, in particular a sinusoidal contour or an L-shaped contour, or an undulating, in particular sinusoidal contour with an L-shaped end section, or is shaped as if by folding wherein, for this purpose, it is the case in particular that the vehicle-body-side end region of the leaf spring element is correspondingly shaped. In this way, it is possible in a particularly simple manner to realize an advantageous force-fitting and form-fitting clamping means, by means of which, in particular, high forces can be transmitted and in particular, a particularly good attachment, fixedly in terms of moments, to the axle support or directly to a vehicle body can be realized.

By means of the corresponding contour of the leaf spring element in this region, it is possible to achieve sufficient security against slipping under external forces, in particular a secure form fit between the leaf spring element and a clamping device. In the restricted structural space conditions that commonly prevail, an undulating, in particular sinusoidal contour has proven to be particularly advantageous, because this generally has a smaller space requirement than, for example, the L-shaped contour.

Furthermore, in the case of this type of clamping means, by contrast to the use of a clamping device known from the prior art, such as is proposed in particular for the wheel-carrier-side attachment of the leaf spring element, no through holes need to be formed into the leaf spring element in the vehicle-body-side end region. In this way, the machining of the leaf spring element at its vehicle-body-side end region can be omitted.

If the contour of the leaf spring element is of L-shaped form in the end region, this contour, for a left-hand-side independent wheel suspension in a view from the rear, is configured in particular in the manner of an "L" rotated 90° to the left, or approximately in the manner of a horizontal "L", with the short limb oriented at least approximately in the vehicle vertical direction, and for a right-hand-side independent wheel suspension, is configured preferably in the manner of an "L" mirror-inverted about the vehicle vertical direction, and rotated 90° to the right.

For the attachment of the leaf spring element fixedly in terms of moments to an axle support and/or directly to a vehicle body, a corresponding clamping device is preferably provided by means of which the leaf spring element is attachable at the vehicle body side fixedly in terms of moments to the axle support and/or directly to the vehicle body, wherein the clamping device in particular has a corresponding opposite contour in relation to the contour of the vehicle-body-side end region of the leaf spring element and is configured to, in a functional clamping state, form a force fit and a form fit with the vehicle-body-side end region of the leaf spring element, wherein the required clamping force can preferably be imparted by means of bolts.

By contrast to a manner of force introduction into a leaf spring element such as is known from the prior art, it is the case here that the bolts preferably however do not run through the leaf spring element itself but only run through the clamping device, such that no corresponding through holes have to be formed into the leaf spring element. In this way, it is firstly the case that no complex mechanical machining of the vehicle-body-side end region of the leaf spring element is necessary, whereby the leaf spring element can be produced in a particularly simple and inexpensive manner. Furthermore, weakening of the leaf spring element in the end region is avoided, which has an advantageous effect on the strength of the leaf spring element.

In one embodiment of an independent wheel suspension for a two-track vehicle, in particular for a rear axle of a two-track vehicle, according to a fourth further invention, the independent wheel suspension is basically designed according to the present invention, wherein the leaf spring element is attachable at the vehicle body side, in particular fixedly in terms of moments by a force-fitting and form-fitting clamping means, to an axle support or directly to a vehicle body, and/or is attached at the wheel carrier side, in particular fixedly in terms of moments by a force-fitting and form-fitting clamping means, to the wheel carrier, and characterized in that a vehicle-body-side end region and/or a wheel-carrier-side end region of the leaf spring element preferably has an undulating contour, in particular a sinusoidal contour or an L-shaped contour, or an undulating, in particular sinusoidal contour with an L-shaped end section, or is shaped as if by folding, wherein, in particular, the respective end region of the leaf spring element is correspondingly shaped.

That is to say, in the case of an independent wheel suspension according to the fourth further invention, contrary to the present invention, neither of the two rubber bearings needs to be inclined by a corresponding inclination angle about the vehicle vertical direction and relative to the vehicle longitudinal direction. Rather, the leaf spring element does not need to be fastened rotatably or pivotably to the wheel carrier by means of two rubber bearings. The leaf spring element may in particular be attached at the wheel carrier side in any desired manner, also fixedly in terms of moments, for example as described in WO 2017/191023 A1, as has already been cited multiple times, or in accordance with the third invention. However, it may then no longer be possible for all of the features of the present invention that have been described in conjunction with the present invention to be realized, in particular the features relating to the rubber bearings, with only those features which are not technically ruled out owing to a different wheel-carrier-side attachment of the leaf spring element to the wheel carrier being able to be realized.

That is to say, an independent wheel suspension according to the fourth further invention preferably has a wheel carrier, a vibration damper configured and arranged in the manner of a damper strut, and a leaf spring element which, in particular, has a fiber composite material or is produced from a fiber composite material, wherein the leaf spring element is oriented at least approximately in a vehicle transverse direction and is configured to perform a suspension function and, together with the vibration damper, wheel guidance of a vehicle wheel which is fastened to the wheel carrier in a functional installed state of the independent wheel suspension in a vehicle, and wherein the leaf spring element is attached to the wheel carrier and is configured to be attached, at a vehicle body side, fixedly in terms of moments to an axle support and/or directly to a vehicle body, wherein the independent wheel suspension is in particular characterized in that the leaf spring element is attachable at the vehicle body side, in particular fixedly in terms of moments by a force-fitting and form-fitting clamping means, to an axle support or directly to a vehicle body, and/or is fastened at the wheel carrier side, in particular fixedly in terms of moments by a force-fitting and form-fitting clamping means, to the wheel carrier, and is characterized in that a vehicle-body-side end region and/or a wheel-carrier-side end region of the leaf spring element preferably has an undulating contour, in particular a sinusoidal contour or an L-shaped contour, or an undulating, in particular sinusoidal contour with an L-shaped end section, or is shaped as if by folding, wherein, for this purpose, in particular, the associated end region of the leaf spring element is correspondingly shaped.

Furthermore, those features which have been described in conjunction with the present invention and which can be technically feasibly implemented may be realized in an independent wheel suspension according to the described fourth further invention.

An axle according to the invention, in particular a rear axle according to the invention, for a two-track vehicle, in particular for a two-track motor vehicle, which axle has an axle support and an independent wheel suspension, is characterized in that it has an independent wheel suspension according to the present invention, wherein the leaf spring element is in particular, at a vehicle body side, attached by way of its vehicle-body-side end region fixedly in terms of moments to the axle support, in particular by a force-fitting and form-fitting clamping means, in particular by means of a clamping device which is fastened fixedly in terms of moments to an axle support and/or directly to the vehicle body. Here, a vehicle-body-side end region of the leaf spring element preferably has an undulating contour, in particular a sinusoidal contour or an L-shaped contour, or an undulating, in particular sinusoidal contour with an L-shaped end section, or is shaped as if by folding. The clamping device preferably has, in particular, a corresponding opposite contour in relation to the contour of the vehicle-body-side end region of the leaf spring element, and the vehicle-body-side end region of the leaf spring element is clamped in the clamping device such that the clamping device forms a force fit and a form fit with the vehicle-body-side end region of the leaf spring element, such that the leaf spring element is, at the vehicle body side, attached fixedly in terms of moments to the axle support. It is particularly preferable here if the axle has, both on the left-hand side and on the right-hand side and oppositely in the vehicle transverse direction, in each case one independent wheel suspension designed according to the invention.

A vehicle according to the invention, in particular a two-track vehicle according to the invention, is characterized in that it has an independent wheel suspension according to the present invention, in particular a rear independent wheel suspension, wherein the leaf spring element is, at a vehicle body side, attached by way of its vehicle-body-side end region fixedly in terms of moments to an axle support of the vehicle and/or directly to the vehicle body, in particular by a force-fitting and form-fitting clamping means, in particular by means of a clamping device which is fastened fixedly in terms of moments to an axle support and/or directly to the vehicle body. Here, a vehicle-body-side end region of the leaf spring element preferably has an undulating contour, in particular a sinusoidal contour or an L-shaped contour, or an undulating, in particular sinusoidal contour with an L-shaped end section, or is shaped as if by folding. The clamping device preferably has, in particular, a corresponding opposite contour in relation to the contour of the vehicle-body-side end region of the leaf spring element, and the vehicle-body-side end region of the leaf spring element is clamped in the clamping device such that the clamping device forms a force fit and a form fit with the vehicle-body-side end region of the leaf spring element, such that the leaf spring element is, at the vehicle body side, attached fixedly in terms of moments to the axle support. It is particularly preferable here if the axle has, both on the left-hand side and on the right-hand side and oppositely in the vehicle transverse direction, in each case one independent wheel suspension designed according to the invention. It is particularly preferable here if the vehicle has at least two independent wheel suspensions designed according to the invention, in particular one on the left-hand side and one on the right-hand side, which are arranged oppositely in the vehicle transverse direction, in particular at the rear axle.

These and further features will emerge not only from the claims and from the description but also from the associated figures, wherein the individual features may be realized in each case individually or severally in the form of subcombinations in an embodiment of the invention and form advantageous and independently protectable embodiments according to the present invention. All of the features and advantages mentioned and described in conjunction with an independent wheel suspension according to the invention also apply here to an axle according to the invention and to a vehicle according to the invention.

The invention will be discussed in more detail below on the basis of one possible advantageous design example and on the basis of preferred design examples of the leaf spring element, wherein, for this purpose, the invention is schematically illustrated in the appended figures.

BRIEF DESCRIPTION OF THE DRAWINGS

FIG. 11a shows the axle according to the invention from FIGS. 1 to 3, 6 and 9, additionally with a brake disk, in a view from obliquely to the front and below.

FIG. 11b shows a detail from FIG. 11 in an enlarged illustration.

FIG. 12 shows a longitudinal section through the rear rubber bearing of the independent wheel suspension from the preceding figures.

DETAILED DESCRIPTION OF THE DRAWINGS

Figure 1:
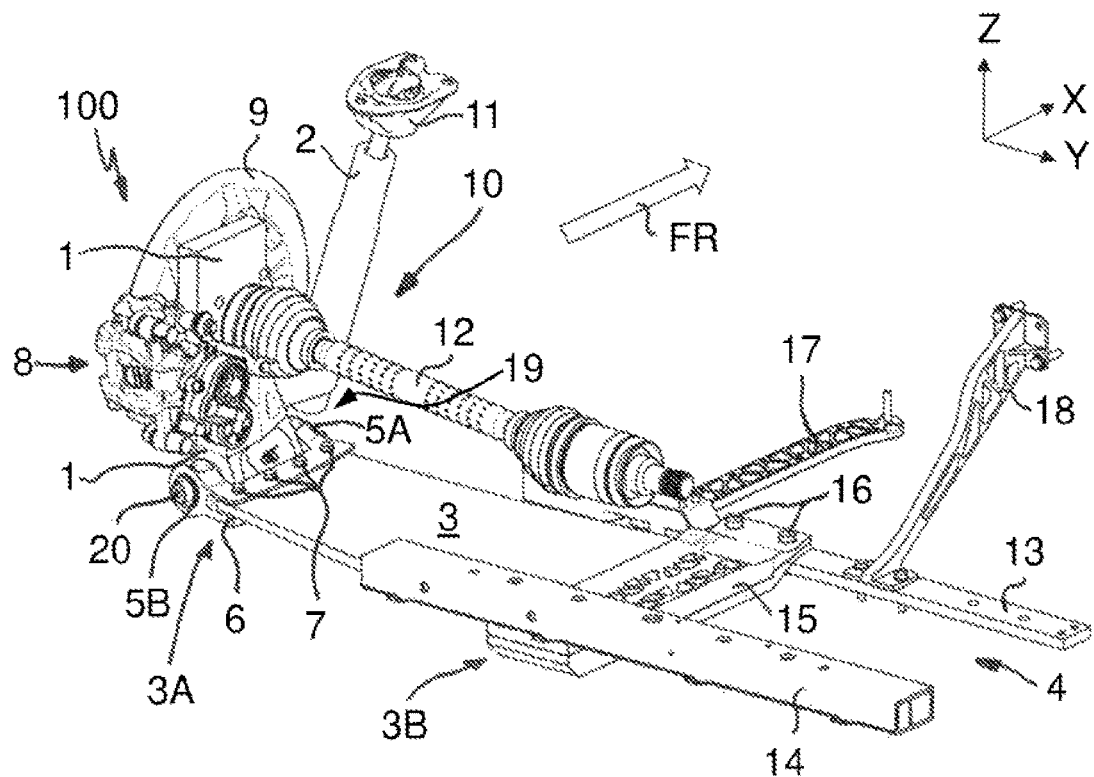
FIG. 1 shows a design example of a left-hand-side part of a rear axle according to the invention in a first perspective illustration.

FIGS. 1 to 3, 6, 9, 11a and 11b show an advantageous design example of a left-hand-side part of a rear axle 100 according to the invention for a two-track vehicle, in particular for a passenger motor vehicle, in various views, wherein the rear axle 100 according to the invention has an independent wheel suspension 10 according to the invention and is configured as a driveable axle with a drive shaft 12.

The independent wheel suspension 10 according to the invention has in this case a wheel carrier 1, to which a brake caliper 8 and a brake protector plate 9 are fastened. Furthermore, a lower end of a vibration damper 2, which is configured as a telescopic vibration damper in the manner of a damper strut, is supported on the wheel carrier 1, in particular in front of a wheel center, that is to say further forward than a wheel center, or in front of the wheel axis of rotation, and also in front of the drive shaft 12, in a direction of travel FR, wherein the vibration damper 2 is rigidly attached to the wheel carrier. As in the manner that is common and known from the prior art, the vibration damper 2 may be fastened at its upper end to the vehicle body by means of a support bearing 11.

The independent wheel suspension 10 furthermore has a leaf spring element 3 which is produced from a fiber composite material, in particular from glass-fiber-reinforced plastic, and which, at its wheel-carrier-side end 3A, is clamped into a clamping device 6 and is fixedly connected to the clamping device 6 by means of bolts 7, which are passed through corresponding through openings in the wheel-carrier-side end region 3A of the leaf spring element and by means of which the required clamping force is imparted.

By means of two rubber bearings 5A and 5B pressed in the conventional manner into the clamping device 6, in particular by means of a further forwardly situated (front) rubber bearing 5A and a further rearwardly situated (rear) rubber bearing 5B, and the clamping device 6, the leaf spring element 3 is, at the wheel carrier side, attached to the wheel carrier 1 in each case so as to be rotatable or pivotable about the bearing axes (not shown here) of the two rubber bearings 5A and 5B, in particular by means of corresponding bolt-nut connections with bearing bolts 19 and 20, which at their ends are each fixed by means of a corresponding nut.

Here, the two rubber bearings 5A and 5B are each configured as so-called sleeve rubber bearings 5A and 5B and each have a corresponding inner sleeve 33 (cf. FIG. 12), which is fixedly connected to the wheel carrier, and an outer sleeve 34, which is arranged concentrically with respect to this inner sleeve and which is fixedly connected to the clamping device 6, in particular is pressed into the clamping device 6.

By means of its vehicle-body-side end 3B, the leaf spring element 3 is clamped in force-fitting and form-fitting fashion in a clamping device 15, as will be described in more detail further below in conjunction with FIG. 9. Here, in this design example of a rear axle 100 according to the invention, the clamping device 15 is screwed by means of bolts 16 in each case to a front transverse member 13 and to a rear transverse member 14 of a rear-axle support 4 or of a vehicle body 4, wherein the clamping device 15 is in this case configured such that the leaf spring element 3 is, at the vehicle body side, attached fixedly in terms of moments to the rear-axle support 4 or to the vehicle body 4. In the case of an attachment to a rear-axle support 4, the rear-axle support 4 may preferably be attached to an associated vehicle body of a vehicle (not illustrated here), both to the transverse members 13 and 14 and furthermore to the two longitudinal struts 17 and 18. In the case of the attachment to a vehicle body 4, the transverse members 13 and 14 and the longitudinal struts 17 and 18 are correspondingly part of the vehicle body 4.

By means of the attachment, configured as described, of the leaf spring element 3 by way of its end regions 3A, 3B to the wheel carrier 1 and to an axle support 4 or to the vehicle body 4, the leaf spring element 3 together with the vibration damper 2 can, aside from its suspension function, also perform a wheel guidance function. Owing to its wheel-guiding function, the leaf spring element 3 can therefore also be referred to as a spring control arm.

The leaf spring element 3 extends substantially in a vehicle transverse direction Y and, in the case of this independent wheel suspension, as can be seen quite clearly from the figures, is of approximately trapezoidal configuration. Its vehicle-body-side side edge extends in this case substantially in a vehicle longitudinal direction X (see for example FIG. 3). In this design example, the wheel-carrier-side side edge of the leaf spring element 3 runs likewise approximately in the vehicle longitudinal direction X, that is to say in particular parallel to the vehicle-body-side side edge, which is clamped in the clamping device 15 and cannot be seen in detail.

Figure 6:
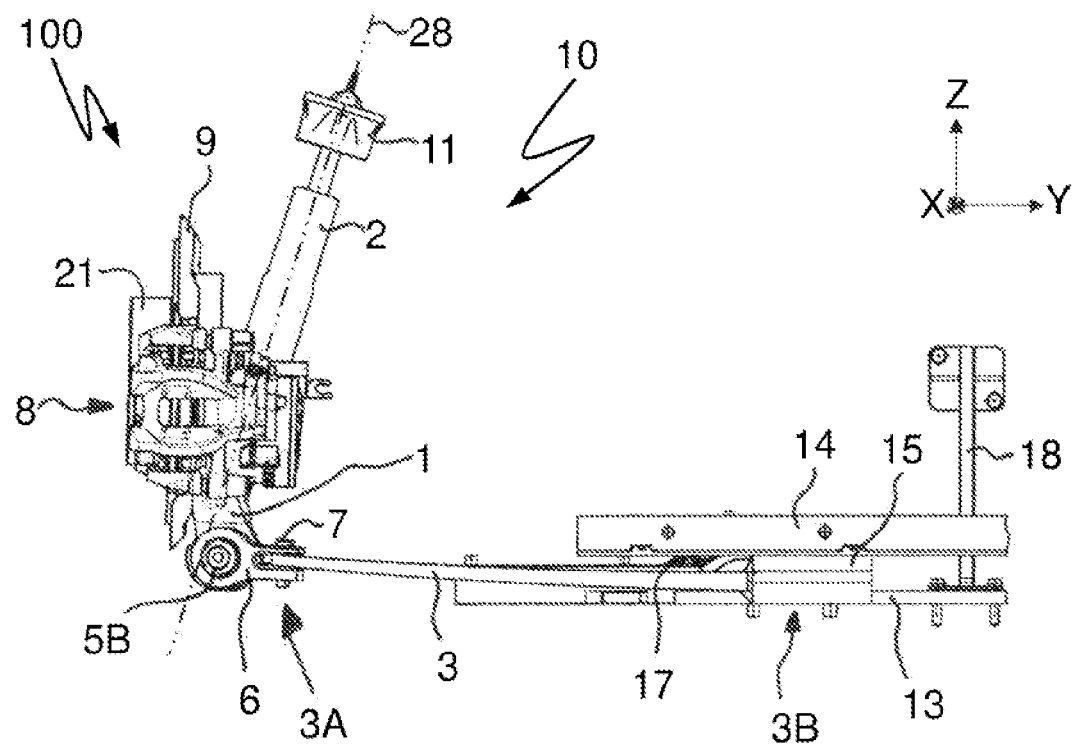
FIG. 6 shows the rear axle according to the invention from FIGS. 1 to 3 in a view from the rear.

For advantageous spring characteristics of the leaf spring element 3, the leaf spring element 3 is in this case, in the unloaded state, convexly curved about the vehicle longitudinal direction X, wherein the wheel-carrier-side end of the leaf spring element 3, in particular the wheel-carrier-side end region 3A of the leaf spring element 3, is in this case, in the loaded state, for example in the design situation, situated only slightly above the vehicle-body-side end region 3B of the leaf spring element in a vehicle vertical direction Z (cf. in particular FIG. 6).

Figure 2:
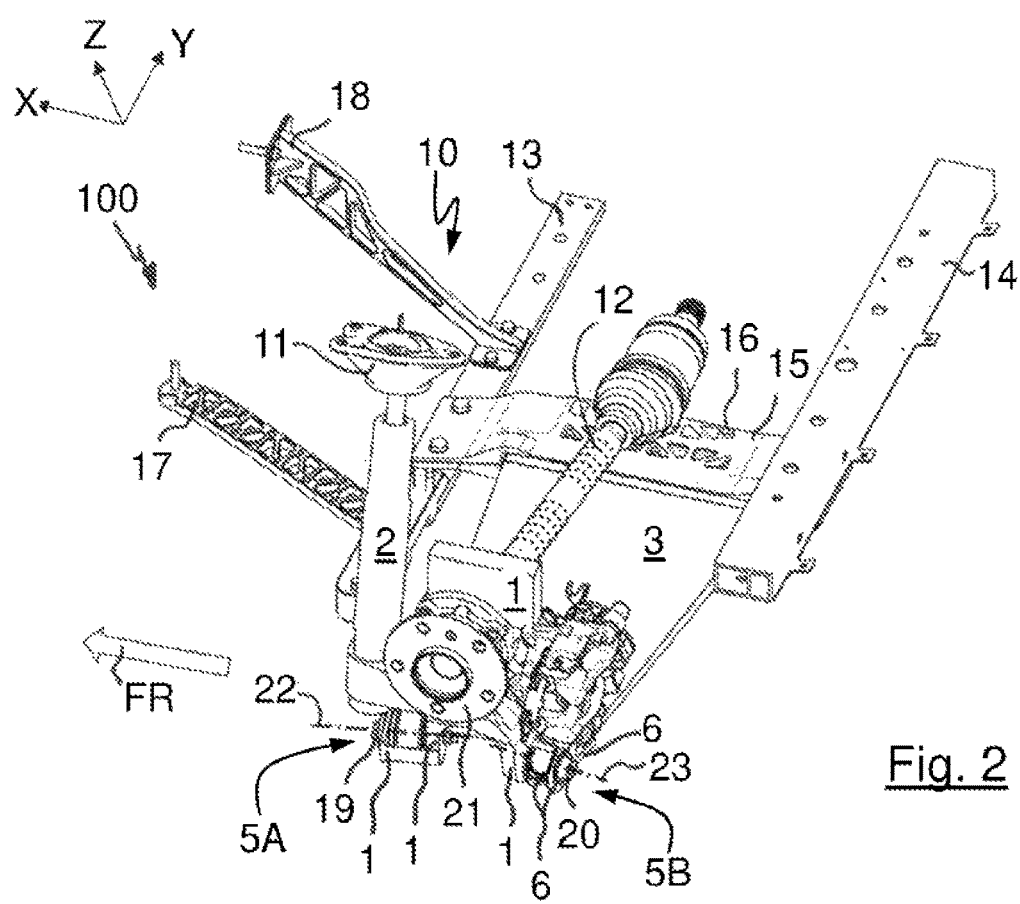
FIG. 2 shows parts of the rear axle from FIG. 1 in a second perspective illustration.
Figure 4:
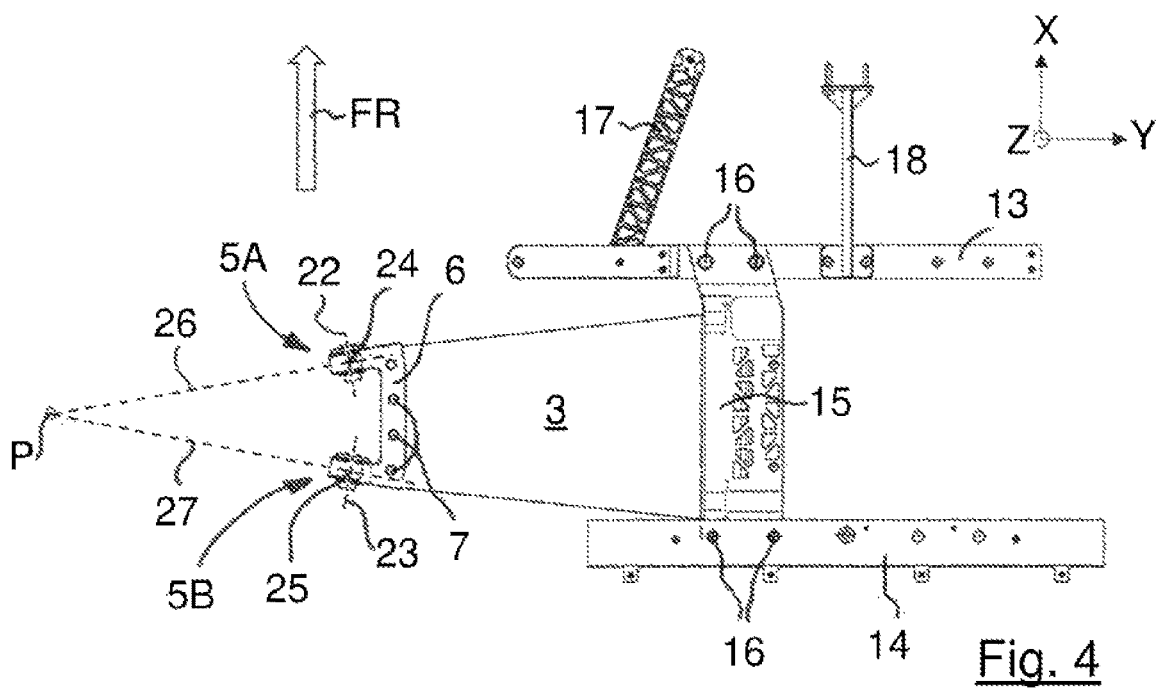
FIG. 4 shows components of the rear axle from FIGS. 1 to 3, likewise in plan view.
Figure 5:
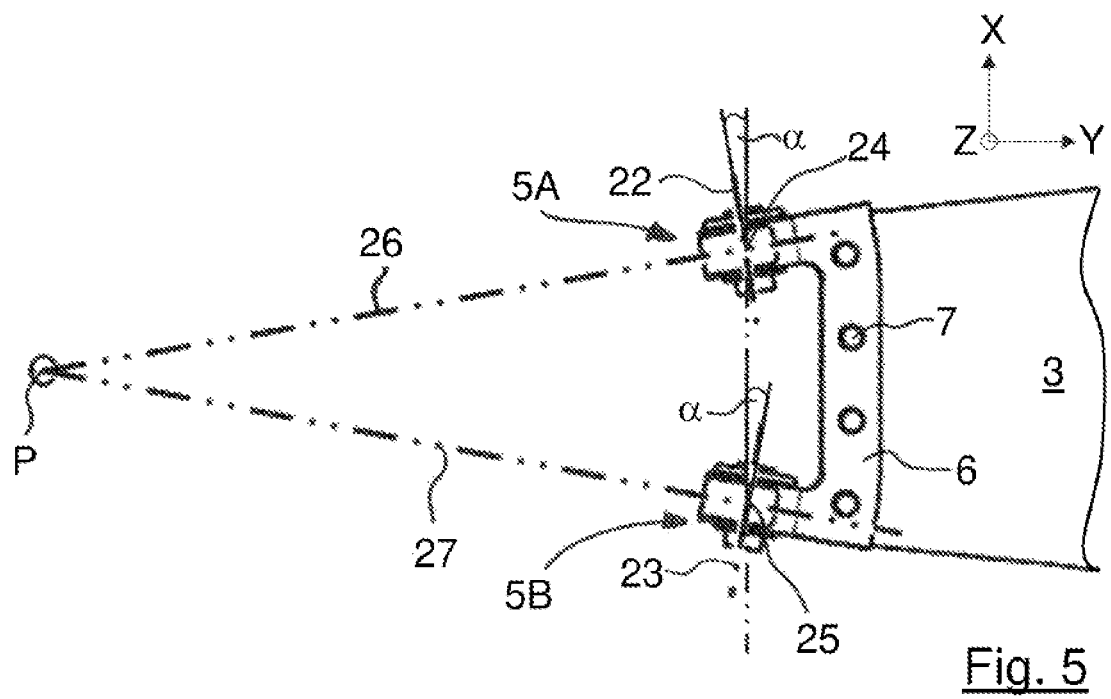
FIG. 5 shows an enlarged detail of the illustration from FIG. 4.

According to the invention, at least one of the two rubber bearings 5A and 5B, in particular both rubber bearings 5A and 5B, is/are arranged such that the associated bearing axis 22 or 23 is inclined with a defined inclination angle α about the vehicle vertical direction Z relative to the vehicle longitudinal direction (see in particular FIGS. 2, 4 and 5).

The inclination according to the invention of the two rubber bearings 5A and 5B, in particular the inclination of their bearing axes 22 and 23 about the vehicle vertical direction Z relative to the vehicle longitudinal direction X, can also be clearly seen in FIG. 2, which shows the rear axle 100 from FIG. 1 in a view from obliquely to the outside of the vehicle and above, without a brake protector plate 9 but with a wheel bearing flange 21. It is likewise possible to clearly see in this illustration the arrangement of the vibration damper 2, in particular its wheel-carrier-side attachment point in front of a wheel center.

By means of the inclination according to the invention of the two rubber bearings 5A and 5B, in particular of their bearing axes 22 and 23 respectively, it is possible, as described in the introduction, to achieve elastokinematic steering characteristics which are advantageous for a rear axle, in particular particularly advantageous toe(-in) characteristics under longitudinal force, in particular under acting braking and drive forces, because such an inclination of the two rubber bearings 5A and 5B has the effect that, under longitudinal force, the toe(-in) angle changes in the manner desired for a rear axle, specifically such that, under braking and lateral forces, the toe-in angle increases, that is to say the independent wheel suspension 10 moves into a toe-in configuration, and, under drive forces, the toe-out angle increases, that is to say the independent wheel suspension 10 moves into a toe-out configuration.

Figure 3:
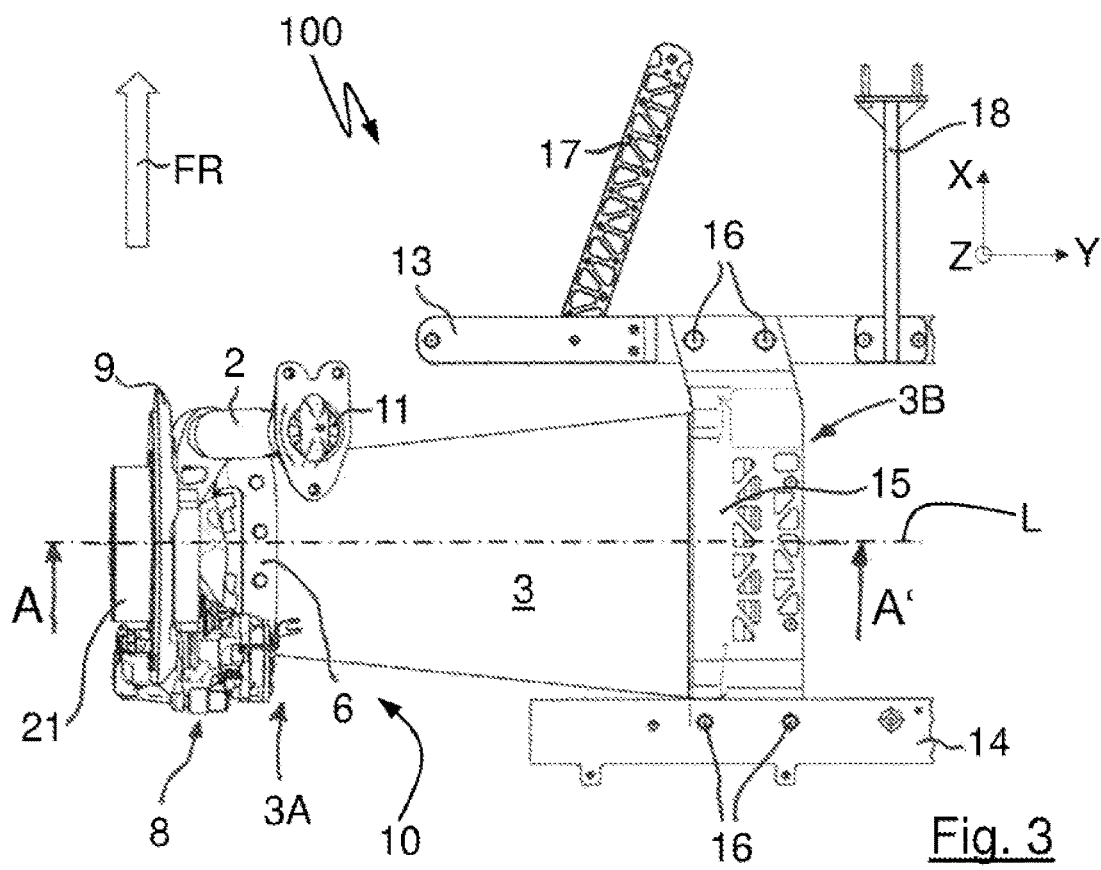
FIG. 3 shows the rear axle from FIG. 1 in a plan view.

From FIG. 3, which shows a plan view of the axle 100 according to the invention from FIGS. 1 and 2, it can furthermore be seen that the vibration damper 2 is tilted toward the inside of the vehicle in the vehicle transverse direction, that is to say its upper end, in particular the support bearing 11, is situated further to the inside of the vehicle than a lower attachment point on the wheel carrier. As described further above, it is possible by means of such an arrangement of the vibration damper 2 to advantageously influence the toe(-in) and camber characteristics of the independent wheel suspension 10.

As can be seen from FIGS. 4 and 5, where FIG. 4 shows components of the rear axle 100 according to the invention in plan view and FIG. 5 shows an enlarged detail of the illustration from FIG. 4, it is the case in the described design example of a rear axle 100 according to the invention that the front rubber bearing 5A, in particular its bearing axis 22, is inclined toward the outside of the vehicle by a defined inclination angle α which differs from 0°, and the rear rubber bearing 5B, or its bearing axis 23, is inclined toward the inside of the vehicle by a defined inclination angle α that differs from 0°. It is achieved in this way that, under acting longitudinal forces, an elastokinematic rotation of the wheel carrier 1 is effected about a center of rotation P which lies outside the wheel center, in particular outside the vehicle, in the vehicle transverse direction Y, wherein the center of rotation P is defined as the point of intersection of the two respective center half-lines 26 and 27 of the two rubber bearings 5A and 5B, which center half-lines are in each case perpendicular to the associated bearing axis 22 or 23 of the respective rubber bearing 5A, 5B and in each case lie in a plane with the associated bearing axis 22 or 23 and intersect the respective associated bearing centerpoint 24 or 25.

Depending on the magnitude of the inclination angle α of the bearing axes 22 and 23 and the rubber bearing support base, that is to say the spacing of the bearing centerpoints of the rubber bearings 5A and 5B in the vehicle longitudinal direction X, the result is a center of rotation P which is situated further outside the vehicle or closer to the vehicle wheel. That is to say, by means of the inclination angle α, it is possible to set a spacing of the center of rotation to the bearing centerpoints 24, 25, and thus to targetedly influence the toe(-in) characteristics, in particular under longitudinal force.

In this design example, the front rubber bearing 5A or its bearing axis 22 is inclined toward the outside of the vehicle by an absolute angle of +10°, and the rear rubber bearing 5B is inclined toward the inside of the vehicle by an absolute angle of −10°. That is to say, the two rubber bearings 5A and 5B are each inclined by the same angular amount of 10°, but in opposite directions. These inclination angles α have proven to be particularly advantageous for the embodiment shown, in particular in conjunction with the selected length of a wheel-carrier-side support base of 200 mm.

As can be seen from FIG. 6, which shows a view of the independent wheel suspension 10 from the rear, it is the case in this design example of a rear axle 100 according to the invention that the two bearing axes 22 and 23 run in a common horizontal plane. This is however not imperative. On the one hand, it is conceivable for one of the two bearings 5A or 5B to be arranged, in particular with its bearing centerpoint 24 or 25 respectively, offset with respect to the other bearing 5B or 5A respectively, in particular upward, in the vehicle vertical direction Z, wherein, for a rear axle, it is particularly preferably the case that the front rubber bearing 5A is offset upward in the vehicle vertical direction Z. In this way, as already described further above, the inclination of the toe(-in) curve versus the wheel lift can be (advantageously) influenced. Furthermore, the bearing axes 22, 23 may also each be tilted relative to a horizontal plane, which is likewise not realized in the present design example.

The vehicle-body-side attachment, which is fixed in terms of moments, of the leaf spring element 3 by means of the clamping device 15 is, in the design example shown, likewise configured and arranged such that the vehicle-body-side end, or the vehicle-body-side end region 3B, of the leaf spring element 3 is situated in a horizontal plane.

In some cases, it may however be advantageous, in particular with regard to a vehicle movement about the vehicle transverse direction Y, that is to say with regard to a pitching movement of the vehicle, if the leaf spring element 3 is, at the vehicle body side, likewise tilted about a horizontal plane in the vehicle longitudinal direction X, wherein, in the case of a rear axle, for advantageous influencing of the pitching characteristics of a vehicle, the leaf spring element 3 is preferably, at the vehicle body side, tilted so as to slope downward toward the rear.

Figure 7:
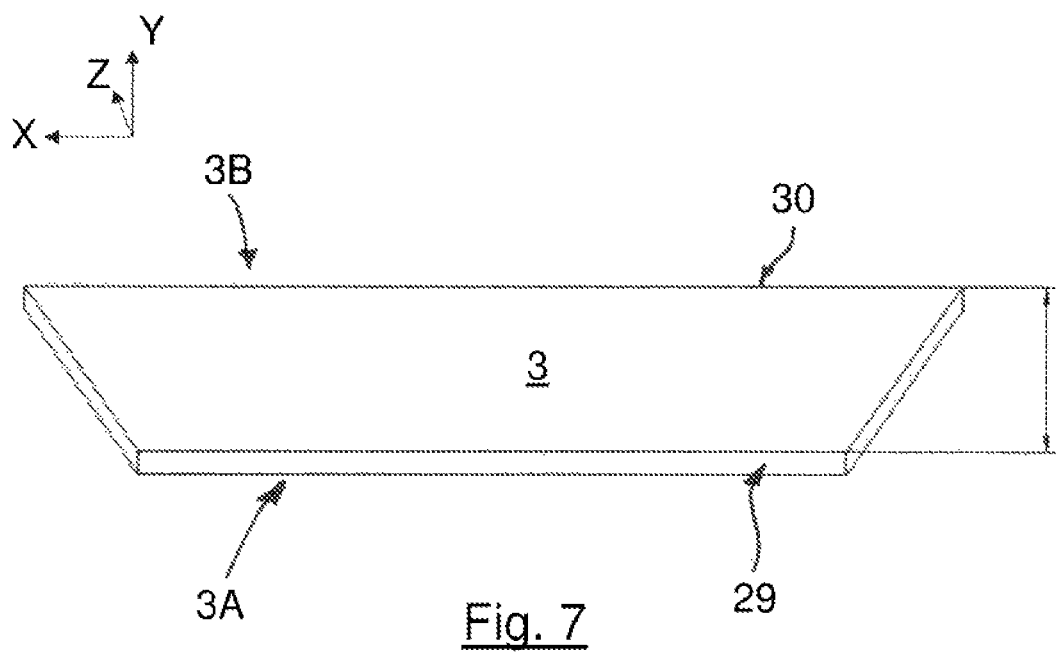
FIG. 7 shows the leaf spring element of the independent wheel suspension of the rear axle from FIGS. 1 to 6, illustrated on its own, from obliquely to the outside of the vehicle and above.

FIG. 7 shows the leaf spring element 3 of the independent wheel suspension 10 of the rear axle 100 from the above figures, illustrated on its own, from obliquely to the outside of the vehicle and above, wherein, in this illustration, it is possible to particularly clearly see the trapezoidal geometry and the parallel-running side edges 29 and 30. The vehicle-body-side side edge 30 is in this case approximately 300 mm in length, whereas the wheel-carrier-side side edge 29 is approximately 200 mm in length, which approximately corresponds to the length of the respectively associated support base, the lengths of which, in conjunction with a magnitude of the inclination angle α of in each case 10° for the two rubber bearings 5A and 5B, or the bearing axes 22 and 23 thereof, have proven in each case to be particularly advantageous with regard to the toe(-in) correction that occurs under longitudinal forces.

Figure 8:
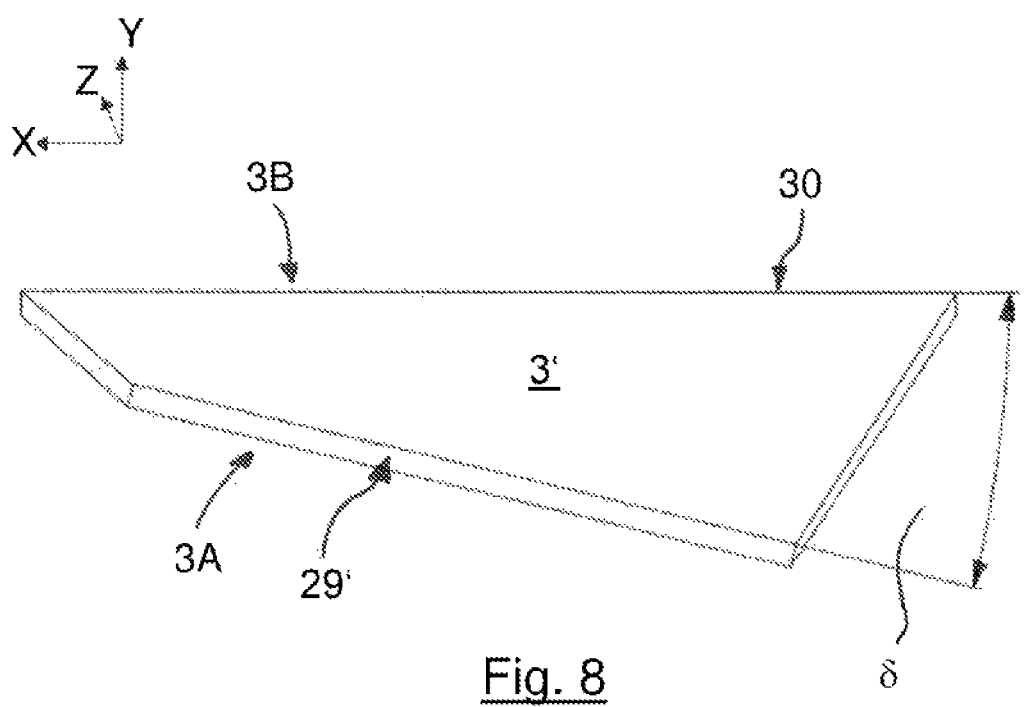
FIG. 8 shows an alternatively designed leaf spring element for an independent wheel suspension according to the invention, likewise in a view from obliquely to the outside of the vehicle and above.

Instead of arranging the bearing centerpoints 24 and 25 of the two rubber bearings 5A and 5B so as to be offset in the vehicle vertical direction Z, as described above, it is alternatively or additionally also possible for the leaf spring element 3 to be of warped configuration, as is schematically illustrated in FIG. 8, which shows a further design example of a leaf spring element 3' for an independent wheel suspension 10 according to the invention, illustrated on its own and in an unloaded state. In the case of this leaf spring element 3', the wheel-carrier-side side edge 29' and the vehicle-body-side side edge 30 do not run parallel but run obliquely with respect to one another with a warp angle δ in between. If this leaf spring element is clamped into the described independent wheel suspension 10 or the above-described rear axle 100, bracing of the leaf spring element 3' results in a warping of the leaf spring element 3', in particular at the wheel carrier side, which gives rise to an effect similar to an offset of the bearing centerpoints 24 and 25 of the two rubber bearings 5A and 5B in the vehicle vertical direction Z, in particular to that obtained with a higher front rubber bearing 5A. The embodiment shown in FIG. 8 is thus correspondingly particularly preferably suitable for a rear axle.

Figure 9:
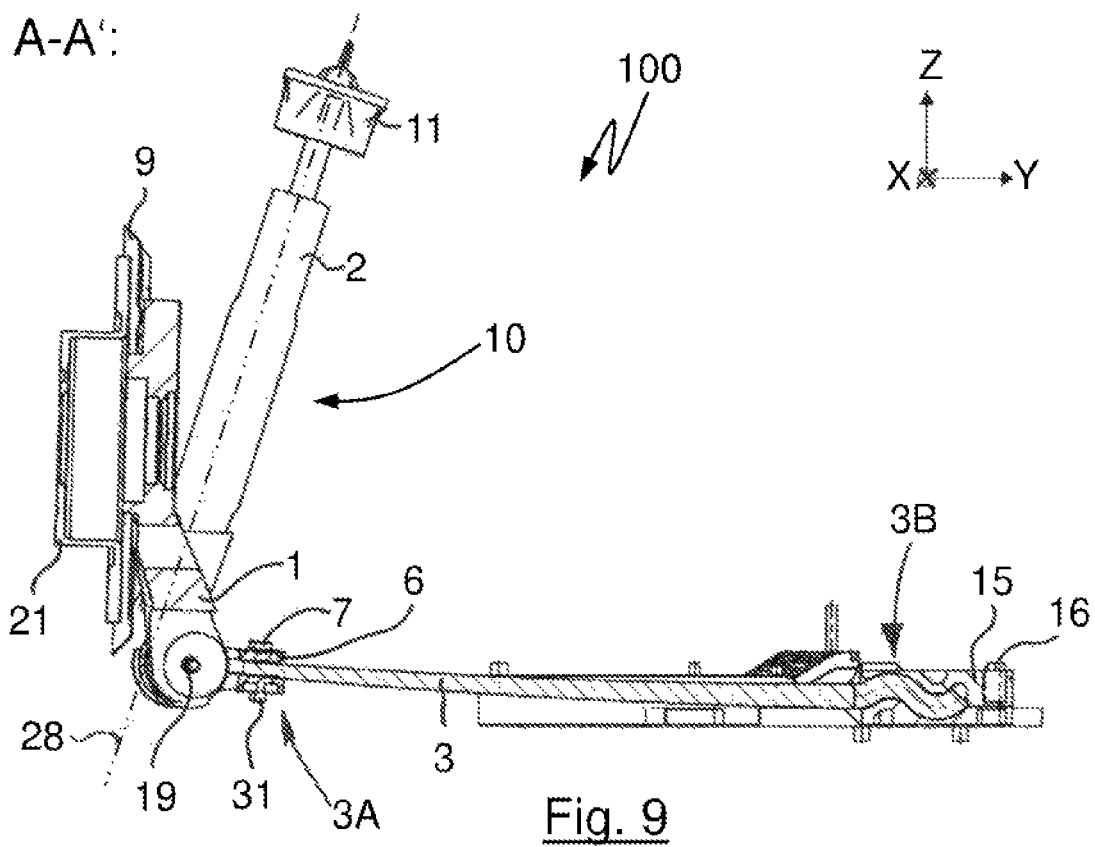
FIG. 9 shows a section along a vertical section plane, running through the wheel center, of the axle from FIG. 3.

FIG. 9 shows a section through the rear axle 100 from FIG. 3 along a vertical section plane running through the wheel center, wherein, in this illustration, it is possible to particularly clearly see the curved shape of the leaf spring element 3, the clamping of the wheel-carrier-side end region 3A of the leaf spring element 3 in the clamp 6, and the obliquity of the vibration damper 2 with respect to the vehicle vertical direction Z, in particular the tilt of the damper strut axis 28 relative to the vehicle vertical direction Z.

It is furthermore possible to particularly clearly see the force-fitting and form-fitting clamping connection between the vehicle-body-side end region 3B of the leaf spring element 3 and the clamping device 15. In this design example, for this purpose, the leaf spring element 3 has a sinusoidal contour at its vehicle-body-side end, in particular in its vehicle-body-side end region 3B, and the clamping device 15 has a corresponding counterpart contour. By means of these contours, it is possible to particularly effectively prevent the vehicle-body-side end region 3B of the leaf spring element 3 from slipping through or out of the clamping device 15. An intense force fit and form fit are furthermore possible owing to the sinusoidal contour. With this embodiment, it is possible to realize a particularly good force-fitting and form-fitting clamping connection and thus provide a secure vehicle-body-side attachment that is fixed in terms of moments. By means of the bolts 16, the required clamping force can be imparted, and the clamping device can be fastened to the rear-axle support 4.

Figure 10:
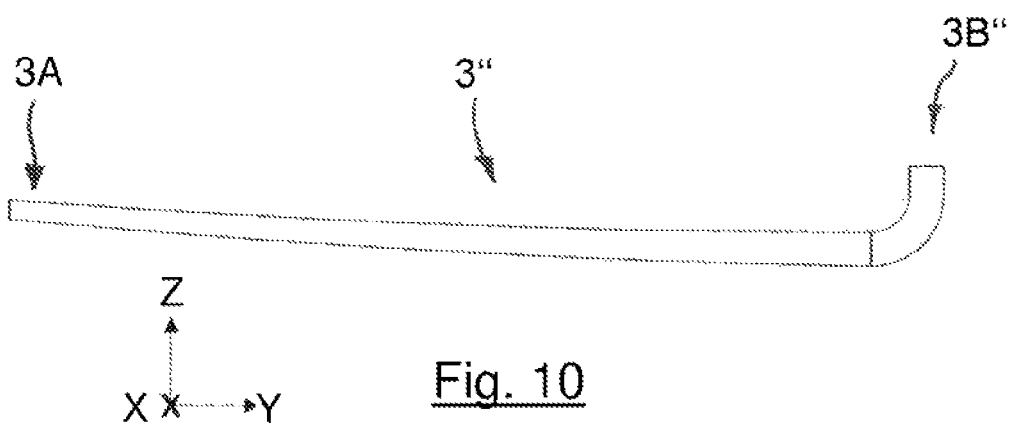
FIG. 10 shows a further possible embodiment of a leaf spring element for an independent wheel suspension according to the invention, illustrated on its own, in a side view.

FIG. 10 shows a further possible embodiment of a leaf spring element 3" for an independent wheel suspension according to the invention, illustrated on its own in a side view, wherein, in the case of this leaf spring element 3", the vehicle-body-side end region 3B" is not of sinusoidal form but has an L-shaped end contour.

Since it is commonly the case that no adjustable-length track rods for toe(-in) adjustment are present at a rear axle, other measures are necessary in order to allow a toe adjustment. In the described design example of a rear axle 100 according to the invention, it is therefore the case, for this reason, that at the front rubber bearing 5A, the bolt-nut connection is produced by means of an eccentric bolt 19, which is supported in a corresponding contour 1 on the wheel carrier, which can be seen in particular from FIGS. 11a and 11b, wherein FIG. 11b shows an enlarged detail from FIG. 11a. By rotation of the eccentric bolt 19 about its longitudinal axis, a displacement of the wheel carrier 1 in the region of the attachment of the rubber bearing 5A in the vehicle transverse direction Y can be effected, whereby a defined toe(-in) angle, in particular a defined initial toe-in angle, at the independent wheel suspension 10 can be adjusted. In the case of this rear axle 100 or this independent wheel suspension 10, the bearing bolt 20 of the other (rear) rubber bearing 5B is of conventional configuration. In some cases, it may however be advantageous for both bearing bolts 19 and 20 to each be configured as eccentric bolts.

From FIG. 11b, it can furthermore be clearly seen how the wheel-carrier-side end region 3A is clamped in the clamping device 6 and is clamped and fixed in the clamp 6 by means of bolts 7 (cf. FIG. 1) and corresponding nuts 31.

FIG. 12 shows a longitudinal section through the rear rubber bearing 5B of the independent wheel suspension 10 with the inner sleeve 33 and the outer sleeve 34. In an annular gap between the inner sleeve 33 and the outer sleeve 34, an annular elastomer element 35 in the form of an elastomer ring 35 is provided, which, by way of its surfaces facing toward the sleeves 33, 34, is fixedly connected in particular cohesively to the respectively facing sleeve 33 or 34 respectively. The sleeves 33 and 34 are arranged concentrically with respect to the bearing axis 22 and are connected to one another by means of the elastomer ring 35.

The front rubber bearing 5A is likewise configured in this manner. The rubber bearings 5A and 5B are each pressed by way of their outer sleeve 34 into the clamping device 6 and fixedly connected by way of their inner sleeve 33 to the wheel carrier 1 (by means of the bolt-nut connections, not illustrated here, by means of the bearing bolts 19 and 20).

In order to limit an axial deformation travel of the rubber bearing 5B under braking force, the rubber bearing 5B has, at its front side, an axial stop 36 which is formed by an L-shaped collar or a type of flange of the outer sleeve 34, which extends radially with respect to the bearing axis 22 of the rubber bearing 5A and on which the wheel carrier 1 can be supported when the maximum admissible deformation travel resulting from a braking force FB acting toward the rear is reached.

Until the maximum admissible deformation travel is reached, an axial stop buffer 37, which is present between the axial stop 36 and a support surface 38 of the wheel carrier 1, and which is likewise produced from an elastomer material and is in particular formed integrally with the elastomer ring 35 between the inner sleeve 33 and the outer sleeve 34, is still effective.

By contrast, in the opposite direction, the rubber bearing 5B has no axial stop, such that a deformation in the opposite direction is possible in unimpeded fashion. Here, the stop buffer 37 is dimensioned such that, under the maximum drive force, the maximum deformation travel is not fully utilized.

Figure 13:
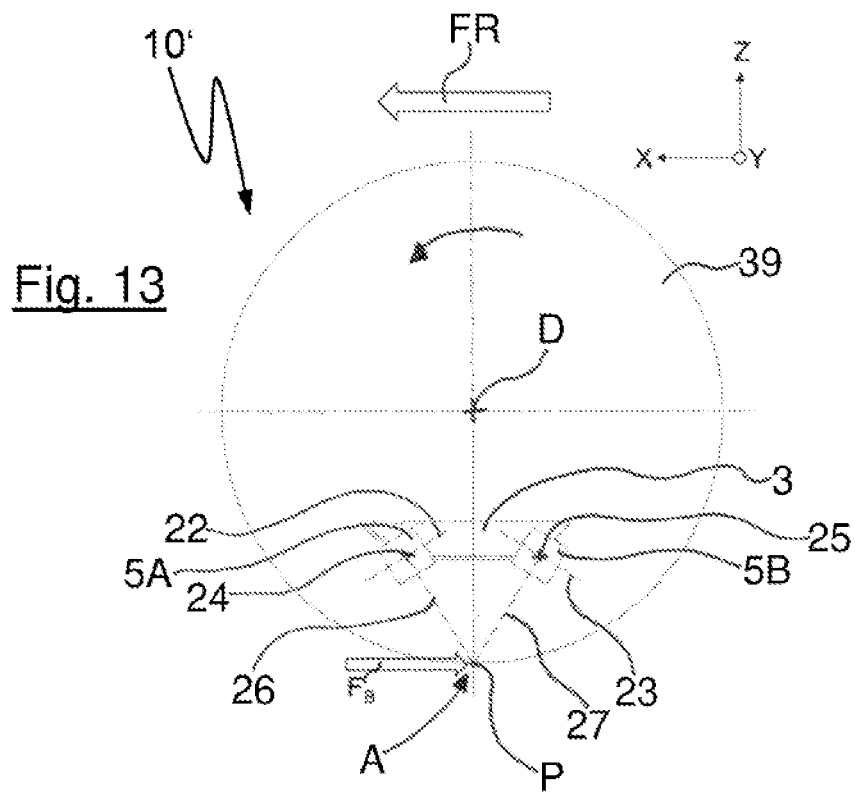
FIG. 13 shows, in a diagrammatic illustration, a side view, from the outside of the vehicle, of a first further design example of a further advantageous embodiment of an independent wheel suspension according to the invention with a particularly advantageous arrangement of the rubber bearings of the wheel-carrier-side attachment.

FIG. 13 shows a diagrammatic illustration, in a side view from the outside of the vehicle, of a first further design example of a further advantageous embodiment of an independent wheel suspension 10' according to the invention with a particularly advantageous arrangement of the rubber bearings 5A, 5B of the wheel-carrier-side attachment of the leaf spring element 3, wherein the two rubber bearings 5A and 5B are basically of identical configuration to the rubber bearings 5A and 5B from the preceding figures, but are additionally each arranged so as to be tilted relative to a horizontal plane.

Here, the two rubber bearings 5A and 5B are arranged such that their bearing axes 22 and 23 are in each case arranged so as to be tilted relative to the horizontal in addition to the inclination with respect to the vehicle longitudinal direction X, wherein, in the design example in FIG. 13, the bearing axes 22, 23 each run so as to be tilted by 30° with respect to the horizontal. As is schematically indicated in FIG. 13, this results in a center of rotation P which lies in the roadway plane, in particular in the tire-contact point A of an associated wheel 39, at which center of rotation the center half-lines 26 and 27, which run perpendicular to the bearing axes 22 and 23 and in each case through the associated bearing centerpoint 24, 25, intersect, and about which center of rotation the wheel 39, and thus also the wheel carrier that is not illustrated here, rotate elastokinematically about the wheel axis D under longitudinal force.

During braking, owing to the elasticities in the wheel suspension, an angle of twist of the wheel 39 about the wheel axis D arises owing to the moment composed of braking force FB and supporting force in the rubber bearings 5A and 5B of spring control arm 3 and vibration damper (not shown here). This angle of twist, also referred to as windup angle, or this twist, also referred to as "windup", of the wheel 39 under longitudinal force, in particular during braking, can lead to so-called "stick-slip effects" in the tire contact patch and consequently to resonance phenomena with high component loads.

If, as illustrated in FIG. 13, it is now the case that the line of action of the braking force FB runs exactly through the center of rotation P, then there is theoretically no resulting angle of twist. In practice, this two-dimensional consideration does not apply exactly, but can considerably reduce the windup tendency of the independent wheel suspension 10', that is to say the tendency for vibration about the wheel axis of rotation D, owing to the tilt of the rubber bearings 5A and 5B as shown in FIG. 13.

Figure 14:
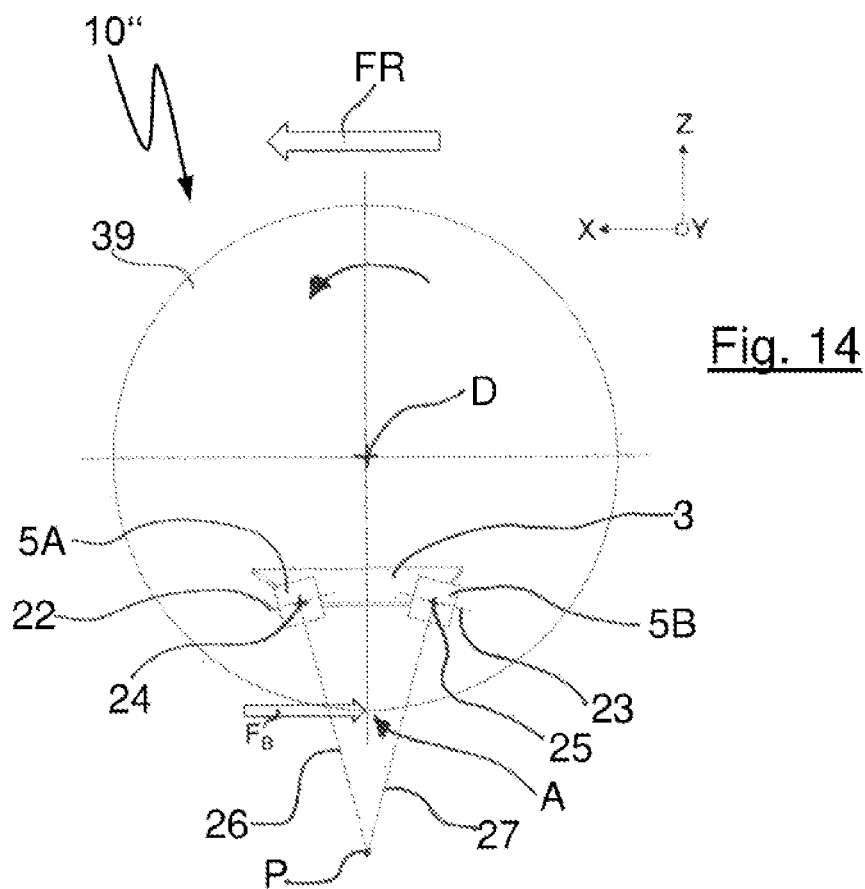
FIG. 14 shows a second further design example.

If, with regard to the cardanic angles that arise during the deflection and rebound movements, the rubber bearings 5A and 5B are tilted relative to the horizontal so as to result in a center of rotation P which lies below the roadway plane, and thus below the tire-contact point A, in the vehicle vertical direction Z, as illustrated in FIG. 14, which shows a second further design example of an independent wheel suspension 10" according to the invention, the windup tendency can likewise be significantly reduced. This is achieved in particular by means of an in each case relatively small tilt angle of the bearing axes 22 and 23 with respect to the horizontal, which in FIG. 14 amounts to in each case 15°.

In addition to the described embodiment possibilities according to the invention, it is basically the case that various modifications, in particular of a structural nature, are possible without departing from the content of the patent claims.

LIST OF REFERENCE DESIGNATIONS

100 Rear axle according to the invention
10, 10', 10" Independent wheel suspension according to the invention
1 Wheel carrier
2 Vibration damper
3, 3', 3" Leaf spring element
3A Wheel-carrier-side end region of the leaf spring element
3B Vehicle-body-side end region of the leaf spring element
4 Rear-axle support or vehicle body
5A Further forwardly situated (front) rubber bearing
5B Further rearwardly situated (rear) rubber bearing
6 Wheel-carrier-side clamping device
7 Bolts
8 Brake caliper
9 Brake protector plate
11 Support bearing
12 Drive shaft
13 Front transverse member of the rear-axle support
14 Rear transverse member of the rear-axle support
15 Vehicle-body-side clamping device
16 Bolts
17 Longitudinal strut of the rear-axle support
18 Longitudinal strut of the rear-axle support
19 Bearing bolt of the front rubber bearing/eccentric bolt
20 Bearing bolt of the rear rubber bearing
21 Wheel bearing flange
22 Bearing axis of the front rubber bearing
23 Bearing axis of the rear rubber bearing
24 Bearing centerpoint of the front rubber bearing
25 Bearing centerpoint of the rear rubber bearing
26 Center half-line of the front rubber bearing
27 Center half-line of the rear rubber bearing
28 Damper strut axis
29, 29' Wheel-carrier-side side edge of the leaf spring element
30 Vehicle-body-side side edge of the leaf spring element
31 Nuts of the wheel-carrier-side clamping device
32 Brake disk
33 Inner sleeve
34 Outer sleeve
35 Elastomer ring
36 Axial stop
37 Axial stop buffer
38 Support surface on wheel carrier
39 Wheel
$\alpha$ Angle of inclination of the bearing axis of the rubber bearing about the vehicle vertical direction relative to the vehicle longitudinal direction
$\delta$ Warp angle
A Tire-contact point
D Wheel axis of rotation
FB Braking force
FR Direction of travel (forward)
L Longitudinal central plane of the leaf spring element
P Center of rotation
X Vehicle longitudinal direction
Y Vehicle transverse direction
Z Vehicle vertical direction

What is claimed is:

1. An independent wheel suspension for a two-track vehicle, comprising:
   a wheel carrier;
   a vibration damper configured and arranged in the manner of a damper strut; and
   a leaf spring element comprising a fiber composite material,
   wherein the leaf spring element is oriented at least approximately in a vehicle transverse direction and is configured to perform a suspension function and, together with the vibration damper, wheel guidance of a vehicle wheel which is fastened to the wheel carrier in a functional installed state of the independent wheel suspension in a vehicle, and wherein the leaf spring element is attached at a wheel carrier side to the wheel carrier via two rubber bearings with, in each case, one bearing axis and one bearing centerpoint, and, in each case, so as to be rotatable about associated bearing axes of the rubber bearings, and is configured to be attached, at a vehicle body side, fixedly in terms of moments to an axle support and/or directly to a vehicle body, wherein at least one of the two rubber bearings is arranged such that, in relation to the functional installed state of the independent wheel suspension in the vehicle, the associated bearing axis of the rubber bearing is inclined by a defined inclination angle, which differs from 0°, about a vehicle vertical direction relative to a vehicle longitudinal direction, and wherein the two rubber bearings are arranged and configured such that, under acting longitudinal forces, an elastokinematic rotation of the wheel carrier about a center of rotation situated outside a wheel center in a vehicle transverse direction is effected about an axis parallel to the vehicle vertical direction.

2. The independent wheel suspension according to claim 1, wherein the two bearings comprise a further forwardly situated rubber bearing and a further rearwardly situated rubber bearing, the leaf spring element is attached at the wheel carrier side to the wheel carrier by way of the further forwardly situated rubber bearing and by way of the further rearwardly situated rubber bearing, the bearing axes of the two rubber bearings are each inclined by a defined inclination angle, which differs from 0°, about the vehicle vertical direction relative to the vehicle longitudinal direction.

3. The independent wheel suspension according to claim 1, wherein the bearing axis of one of the two rubber bearings is inclined toward the outside of the vehicle.

4. The independent wheel suspension according to claim 3, wherein the two bearings comprise a further forwardly situated rubber bearing and a further rearwardly situated rubber bearing, and the inclined bearing axis is the bearing axis of the further forwardly situated rubber bearing.

5. The independent wheel suspension according to claim 1, wherein the bearing axis of one of the two rubber bearings is inclined toward the inside of the vehicle.

6. The independent wheel suspension according to claim 5, wherein the two bearings comprise a further forwardly situated rubber bearing and a further rearwardly situated rubber bearing, and the inclined bearing axis is the bearing axis of the further rearwardly situated rubber bearing.

7. The independent wheel suspension according to claim 1, wherein a magnitude of at least one inclination angle of at least one bearing axis is at least 3° and at most 15°.

8. The independent wheel suspension according to claim 7, wherein a magnitude of at least one inclination angle of at least one bearing axis is at least 10°.

9. The independent wheel suspension according to claim 1, wherein at least one of the two bearing axes is additionally tilted by a defined angle relative to a horizontal plane, such that one or both rubber bearings are tilted, wherein a center of rotation of one or both rubber bearings lies in the roadway plane or below the roadway plane, in relation to a functional installed state in a vehicle in at least one state of the independent wheel suspension.

10. The independent wheel suspension according to claim 1, wherein the leaf spring element is attached in a warped manner to the wheel carrier, the leaf spring element is configured such that, in an unloaded, uninstalled state of the leaf spring element, a wheel-carrier-side side edge and a vehicle-body-side side edge of the leaf spring element run obliquely with respect to one another with a defined warp angle in between.

11. The independent wheel suspension according to claim 1, wherein the leaf spring element together with its wheel-carrier-side and vehicle-body-side attachment points is offset in the vehicle longitudinal direction toward the rear of the vehicle, such that, a center of area of the leaf spring element and/or a longitudinal central plane, which extends at least approximately in the vehicle transverse direction, of the leaf spring element lies behind a wheel center in a vehicle longitudinal direction.

12. The independent wheel suspension according to claim 1, wherein at least one rubber bearing has an axial stop for limiting an axial deformation travel of the rubber bearing, the axial stop is configured to limit an axial deformation travel of the rubber bearing that is caused by a longitudinal force acting in the direction of the rear of the vehicle.

13. The independent wheel suspension according to claim 12, wherein the axial deformation travel is an axial deformation travel of the rubber bearing that is caused by a braking force acting in the direction of the rear of the vehicle.

14. The independent wheel suspension according to claim 1, wherein at least one rubber bearing is fastened to the wheel carrier by way of an eccentric bolt such that a defined toe angle can be set by rotation of the eccentric bolt about its longitudinal axis.

15. The independent wheel suspension according to claim 13, wherein the eccentric bolt is supported on the wheel carrier, and the wheel carrier is configured such that a displacement of the wheel carrier in the region of the attachment of the rubber bearing in the vehicle transverse direction can be effected by a rotation of the eccentric bolt.

16. The independent wheel suspension according to claim 1, wherein the leaf spring element is attachable at the vehicle body side, fixedly in terms of moments by a force-fitting and form-fitting clamping device, to an axle support or directly to a vehicle body, a vehicle-body-side end region of the leaf spring element has an undulating contour.

17. The independent wheel suspension according to claim 16, wherein the undulating contour is a sinusoidal contour, an L-shaped contour, a sinusoidal contour with an L-shaped end section, or has a folded shape.

18. The independent wheel suspension according to claim 15, further comprising:
a clamping device which is fastenable fixedly in terms of moments to an axle support and/or directly to a vehicle body and by which the leaf spring element is attachable at a vehicle body side fixedly in terms of moments to the axle support and/or directly to the vehicle body, wherein
the clamping device has a corresponding opposite contour in relation to the contour of the vehicle-body-side end region of the leaf spring element and is configured to, in a functional clamping state, form a force fit and a form fit with the vehicle-body-side end region of the leaf spring element.

19. An axle for a two-track vehicle, comprising:
an axle;
an independent wheel suspension according to claim 1, wherein
the leaf spring element is, at a vehicle body side, attached by way of its vehicle-body-side end region fixedly in terms of moments to an axle support of the axle or to a vehicle body of the vehicle.

20. A vehicle, comprising:
a vehicle body;
an axle support; and
an independent wheel suspension according to claim 1, wherein
the leaf spring element is, at a vehicle body side, attached by way of its vehicle-body-side end region fixedly in terms of moments to the axle support of the vehicle and/or directly to the vehicle body.

21. An independent wheel suspension for a two-track vehicle, comprising:
a wheel carrier;
a vibration damper configured and arranged in the manner of a damper strut; and
a leaf spring element comprising a fiber composite material,
wherein the leaf spring element is oriented at least approximately in a vehicle transverse direction and is configured to perform a suspension function and, together with the vibration damper, wheel guidance of a vehicle wheel which is fastened to the wheel carrier in a functional installed state of the independent wheel suspension in a vehicle, and
wherein the leaf spring element is attached at a wheel carrier side to the wheel carrier via two rubber bearings with, in each case, one bearing axis and one bearing centerpoint, and, in each case, so as to be rotatable about associated bearing axes of the rubber bearings, and is configured to be attached, at a vehicle body side, fixedly in terms of moments to an axle support and/or directly to a vehicle body,
wherein at least one rubber bearing is arranged such that, in relation to the functional installed state of the independent wheel suspension in the vehicle, the associated bearing axis of the rubber bearing is inclined by a defined inclination angle, which differs from 0°, about a vehicle vertical direction relative to a vehicle longitudinal direction, and
wherein a magnitude of at least one inclination angle of at least one bearing axis is at least 3° and at most 15°.

22. An independent wheel suspension for a two-track vehicle, comprising:
a wheel carrier;
a vibration damper configured and arranged in the manner of a damper strut; and
a leaf spring element comprising a fiber composite material,
wherein the leaf spring element is oriented at least approximately in a vehicle transverse direction and is configured to perform a suspension function and, together with the vibration damper, wheel guidance of a vehicle wheel which is fastened to the wheel carrier in a functional installed state of the independent wheel suspension in a vehicle, and
wherein the leaf spring element is attached at a wheel carrier side to the wheel carrier via two rubber bearings with, in each case, one bearing axis and one bearing centerpoint, and, in each case, so as to be rotatable about associated bearing axes of the rubber bearings, and is configured to be attached, at a vehicle body side, fixedly in terms of moments to an axle support and/or directly to a vehicle body,
wherein at least one rubber bearing is arranged such that, in relation to the functional installed state of the independent wheel suspension in the vehicle, the associated bearing axis of the rubber bearing is inclined by a defined inclination angle, which differs from 0°, about a vehicle vertical direction relative to a vehicle longitudinal direction, and
wherein the bearing axis of one of the two rubber bearings is inclined toward the outside of the vehicle.

* * * * *